US012200348B2

(12) United States Patent
Xu et al.

(10) Patent No.: US 12,200,348 B2
(45) Date of Patent: Jan. 14, 2025

(54) UNDER-DISPLAY CAMERA SYSTEMS AND METHODS

(71) Applicant: QUALCOMM Incorporated, San Diego, CA (US)

(72) Inventors: Yongjun Xu, Beijing (CN); Zack Qing Zhou, San Diego, CA (US); Nan Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/768,092

(22) PCT Filed: Oct. 16, 2020

(86) PCT No.: PCT/CN2020/121393
§ 371 (c)(1),
(2) Date: Apr. 11, 2022

(87) PCT Pub. No.: WO2021/093513
PCT Pub. Date: May 20, 2021

(65) Prior Publication Data
US 2023/0164426 A1 May 25, 2023

(30) Foreign Application Priority Data

Nov. 15, 2019 (WO) ................ PCT/CN2019/118746
Jun. 1, 2020 (WO) ................ PCT/CN2020/093726

(51) Int. Cl.
*H04N 23/63* (2023.01)
*H04M 1/02* (2006.01)
(Continued)

(52) U.S. Cl.
CPC ......... *H04N 23/632* (2023.01); *H04N 5/2628* (2013.01); *H04N 23/53* (2023.01);
(Continued)

(58) Field of Classification Search
CPC .... H04N 23/632; H04N 5/2628; H04N 23/53; H04N 23/667; H04N 23/81; H04N 23/85; H04M 1/0264
See application file for complete search history.

(56) References Cited

U.S. PATENT DOCUMENTS 10,303,921 B1 * 5/2019 He ...................... G02F 1/13318
11,153,520 B2 * 10/2021 Park ...................... H04N 25/633
(Continued)

FOREIGN PATENT DOCUMENTS

CN 101352049 A 1/2009
CN 102404582 A 4/2012
(Continued)

OTHER PUBLICATIONS

International Search Report and Written Opinion—PCT/CN2019/118746—ISA/EPO—Aug. 19, 2020 8 Pages.
(Continued)

*Primary Examiner* — Padma Haliyur
(74) *Attorney, Agent, or Firm* — QUALCOMM Incorporated

(57) ABSTRACT

An example image capture device includes a display configured to display captured images, a camera sensor, the camera sensor being disposed to receive light through at least a portion of the display, memory configured to store captured images, and one or more processors coupled to the camera sensor, the display, and the memory. The one or more processors are configured to receive a signal from a sensor. The one or more processors are configured to determine, based at least in part on the signal, a user interface mode. The user interface mode includes a first mode having a first number of black pixels or a second mode having a second number of black pixels. The first number is greater than the
(Continued)

second number. The one or more processors are also configured to receive image data from the camera sensor.

34 Claims, 17 Drawing Sheets

(51) Int. Cl.
- *H04N 5/262* (2006.01)
- *H04N 23/53* (2023.01)
- *H04N 23/667* (2023.01)
- *H04N 23/81* (2023.01)
- *H04N 23/85* (2023.01)

(52) U.S. Cl.
CPC .......... *H04N 23/667* (2023.01); *H04N 23/81* (2023.01); *H04N 23/85* (2023.01); *H04M 1/0264* (2013.01)

(56) References Cited

U.S. PATENT DOCUMENTS

| | | | |
|---|---|---|---|
| 2003/0058350 A1* | 3/2003 | Ishimaru | H04N 23/88 348/223.1 |
| 2007/0002130 A1 | 1/2007 | Hartkop | |
| 2008/0001069 A1* | 1/2008 | Perlman | H04N 25/60 348/E5.079 |
| 2008/0106628 A1* | 5/2008 | Cok | H04N 7/144 348/E5.022 |
| 2009/0102763 A1* | 4/2009 | Border | H04N 7/144 345/87 |
| 2010/0194961 A1 | 8/2010 | Patel | |
| 2012/0182276 A1 | 7/2012 | Kee | |
| 2013/0093915 A1* | 4/2013 | Zhang | H04N 23/88 382/167 |
| 2015/0243228 A1 | 8/2015 | Kimura | |
| 2015/0271392 A1* | 9/2015 | Musgrave | G09G 3/3406 348/207.11 |
| 2015/0356902 A1 | 12/2015 | Seo et al. | |
| 2017/0078596 A1* | 3/2017 | Chesnokov | H04N 9/646 |
| 2017/0084231 A1* | 3/2017 | Chew | G09G 3/20 |
| 2017/0124942 A1* | 5/2017 | Evans, V | G02B 27/0093 |
| 2017/0171448 A1 | 6/2017 | Evans, V et al. | |
| 2020/0152154 A1* | 5/2020 | Chu | G09G 3/2003 |
| 2020/0389575 A1* | 12/2020 | Gove | H04N 13/239 |
| 2021/0065606 A1* | 3/2021 | Park | G09G 3/20 |
| 2021/0266425 A1* | 8/2021 | Nakata | H01L 27/14625 |
| 2023/0168711 A1* | 6/2023 | Srikanth | H04N 25/615 382/154 |

FOREIGN PATENT DOCUMENTS

| | | |
|---|---|---|
| CN | 103891265 A | 6/2014 |
| CN | 105208360 A | 12/2015 |
| CN | 108604432 A | 9/2018 |
| CN | 108604640 A | 9/2018 |
| CN | 109743430 A | 5/2019 |
| CN | 109830495 A | 5/2019 |
| CN | 110012136 A | 7/2019 |
| WO | 2011073243 A1 | 6/2011 |

OTHER PUBLICATIONS

International Search Report and Written Opinion—PCT/CN2020/093726—ISA/EPO—Sep. 3, 2020 9 Pages.
International Search Report and Written Opinion—PCT/CN2020/121393—ISA/EPO—Jan. 5, 2021 9 Pages.
International Preliminary Report on Patentability from International Application No. PCT/CN2019/118746, dated May 27, 2022, 5 pp.
International Preliminary Report on Patentability from International Application No. PCT/CN2020/093726, dated May 27, 2022, 5 pp.
International Preliminary Report on Patentability from International Application No. PCT/CN2020/121393, dated May 27, 2022, 7 pp.
Supplementary European Search Report—EP20887668—Search Authority—Munich—Aug. 2, 2023 13 Pages.

* cited by examiner

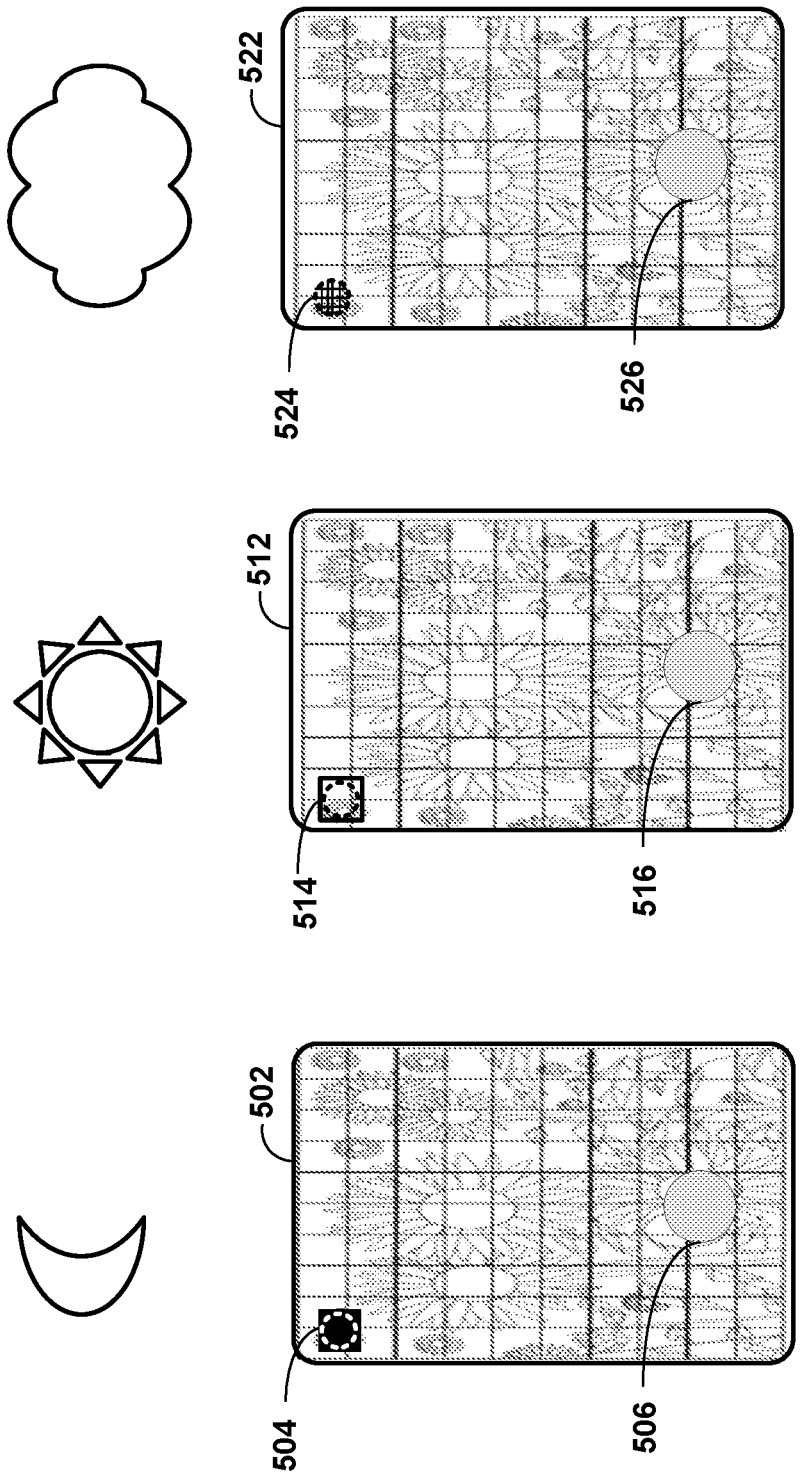

UNDER-DISPLAY CAMERA SYSTEMS AND METHODS

CROSS-REFERENCE TO RELATED APPLICATIONS

This application is a national stage application under 35 U.S.C. § 371 of PCT Application No. PCT/CN2020/121393, filed Oct. 16, 2020, which claims priority to PCT Application PCT/CN2019/118746, filed on Nov. 15, 2019, and to PCT Application PCT/CN2020/093726, filed on Jun. 1, 2020, the entire content of each are incorporated by reference.

TECHNICAL FIELD

This disclosure generally relates to image and camera processing.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile phones (including cellular or satellite radio phones), camera-equipped tablets or personal digital assistants (PDAs), computer devices that include cameras such as so-called "webcams," or any devices with digital imaging or video capabilities.

Image capture devices may be capable of producing imagery under a variety of lighting conditions (e.g., illuminants). For example, image capture devices may operate in environments that include large amounts of reflected or saturated light, as well as in environments that include high levels of contrast. Some example image capture devices include an adjustment module for auto exposure control, auto white balance, and auto focus, in addition to other modules (e.g., a tint adjustment module), to adjust the processing performed by the imaging signal processor hardware.

SUMMARY

In general, this disclosure describes techniques for image processing, including performing display shade compensation for under-display camera sensors, such as those used in front-facing cameras. One way to maximize display size on an image capture device is to place one or more camera sensors underneath the display. When a camera sensor is placed under a display, such as a liquid crystal display (LCD), a light-emitting diode (LED) display, an organic light-emitting diode (OLED) display, an active matrix organic light-emitting diode (AMOLED), which may be a specific example of an OLED display, or other display, the layers of the display shade the camera sensor, so that less intensive and less accurate image information is received by the camera sensor than if the camera sensor was not under the display. For example, layers of the display may attenuate the ambient light reaching the camera sensor and sub-pixels above the camera sensor may cause shading, such as spatial strides and shadows.

Sub-pixels include elements that make up a pixel, such as red, blue and green elements of an RGB pixel. Additionally, if the pixels above the camera sensor are displaying content, the camera sensor may capture light that is scattered by the displayed content. Additionally, display transparency (e.g., OLED transparency) within sub pixel regions may be affected by the sub pixel value or current intensity. Natural light travels through the display onto the camera sensor. The display transparency (e.g., OLED transparency) and sub pixel physical region transparency may be affected by the displayed content pixel value. The pixel value (which becomes a sub pixel driving current) will affect natural light absorption and amount of light that passes through the display. The region of the display through which the natural light is passing may have areas with physical pixel elements and areas without physical pixel elements. The transparency rate (or amount of light that passes through the display) may be different for areas with physical pixel elements and areas without physical pixel elements. The transparency of pixels may be affected by pixel values while the display is actively displaying content. Additionally, as the display ages, the display transparency may decrease due to current driving the pixels and time.

In some examples, locating a camera sensor partially under at least a portion of a display or adjacent to a display may result in display shading and the camera sensor may also capture light scattered by the displayed content. This disclosure describes techniques for addressing and/or compensating for these issues with under-display cameras, such as camera sensors disposed below displays, partially below displays or adjacent to displays, such that light passes through a display layer before being received by the camera sensor.

Additionally or alternatively, in some examples, preset parameters relating to the size, shape and location of the sub-pixels in the display may be stored in the image capture device. The image capture device may also determine an aging factor related to the aging state of the pixels in the display over the camera sensor. A portion of or all of display content may be captured and an adjustment matrix, such as a two-dimensional gain matrix, may be created based on the aging factor, the preset parameters and/or the at least a portion of content to be displayed. As used herein, a portion of content to be displayed means a portion of one or more frames, one or more entire frames, or a combination of both. A portion of a frame means either a portion of a frame or an entire frame. The adjustment matrix may be applied to an image captured by the camera sensor to compensate for the display shading.

This disclosure also describes techniques for improving transmittance in a display. These techniques for improving transmittance are complementary or alternative to the image processing techniques of this disclosure and may be used with the image processing techniques disclosed herein or may be used separately. In one example, a first user interface (UI) mode for use with an image capture application may be automatically selected that improves the display transparency when the image capture application is used in low ambient light situations when compared to a second UI mode which may display content, where a portion or all of the content is displayed over a camera sensor. In some examples, a third UI mode may be used, for example, in medium ambient light situations. In some examples, the selection of a UI mode may be based at least in part on a sensor signal.

In one example of this disclosure, a method of image processing includes receiving, at an image capture device, first image data captured by a camera sensor, wherein the camera sensor is disposed to receive light through at least a portion of a display on the image capture device; receiving, at the image capture device, at least a portion of display content; determining, at the image capture device, an adjustment matrix based on the at least a portion of display content; applying the adjustment matrix to the first image data to create second image data; and outputting the second image data.

In another example, this disclosure describes an image capture apparatus includes memory; and one or more processors coupled to a camera sensor and the memory and being configured to: receive first image data from the camera sensor, the camera sensor being disposed to receive light through at least a portion of a display; receive at least a portion of display content; determine an adjustment matrix based on the at least a portion of display content; apply the adjustment matrix to the first image data to create second image data; and output the second image data.

In another example, this disclosure describes an image capture apparatus includes means for receiving first image data from a camera sensor, the camera sensor being disposed to receive light through at least a portion of a display; means for receiving at least a portion of display content; means for determining an adjustment matrix based on the at least a portion of display content; means for applying the adjustment matrix to the first image data to create second image data; and means for outputting the second image data.

In another example, this disclosure describes a non-transitory computer-readable storage medium storing instructions that, when executed, causes one or more processors to receive first image data from a camera sensor, the camera sensor being disposed to receive light through at least a portion of a display; receive at least a portion of display content; determine an adjustment matrix based on the at least a portion of display content; apply the adjustment matrix to the first image data to create second image data; and output the second image data.

In one example of this disclosure, a method includes receiving, by an image capture device, a signal from a sensor; determining, by an image capture device and based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number; and receiving, by the image capture device, image data from a camera sensor, wherein the camera sensor is disposed to receive light through at least a portion of the display.

In another example, this disclosure describes an image capture apparatus including a display configured to display captured images, an under-display camera sensor, the under-display camera sensor being disposed to receive light through at least a portion of the display, memory configured to store captured images, and one or more processors coupled to the camera sensor, the display, and the memory and being configured to: receive a signal from a sensor; determine, based at least in part on the signal, a user interface mode, the user interface mode comprising a first mode or a second mode, wherein the first mode comprises a first number of black pixels in a region of the display and the second mode comprises a second number of black pixels in the region of the display, the first number being greater than the second number; and receive image data from the camera sensor.

In another example, this disclosure describes an image capture apparatus includes means for receiving a signal from a sensor; means for determining, based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number; and means for receiving, by the image capture device, image data from a camera sensor, wherein the camera sensor is disposed to receive light through at least a portion of the display.

In another example, this disclosure describes a non-transitory computer-readable storage medium storing instructions that, when executed, causes one or more processors to: receive a signal from a sensor; determine, based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number; and receive image data from a camera sensor, wherein the camera sensor is disposed to receive light through at least a portion of the display.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIGS. 8A-8C are conceptual diagrams illustrating different example UI modes in a region of a display over an under-display camera sensor in accordance with the techniques of this disclosure.

DETAILED DESCRIPTION

Figure 1:
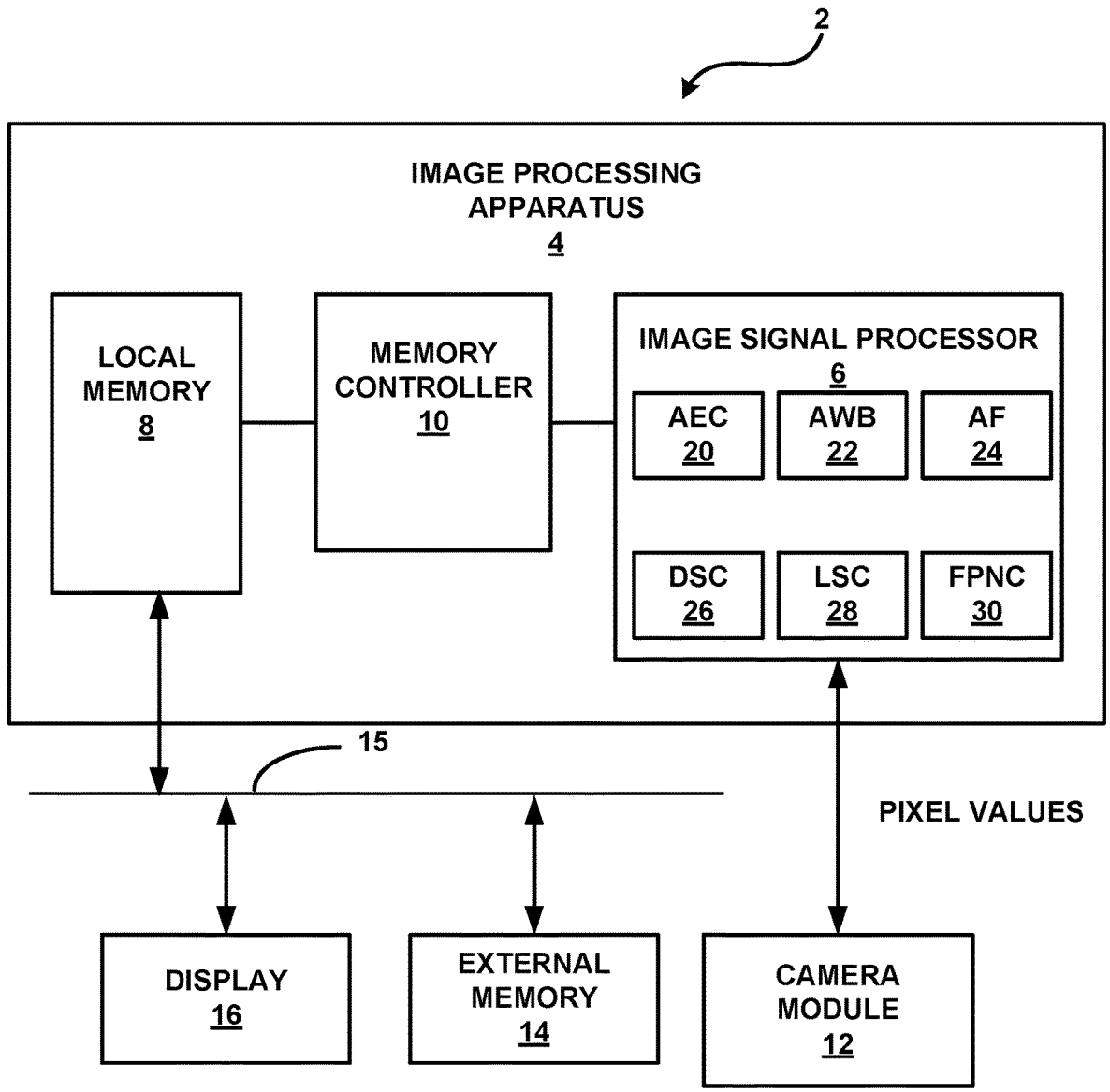
FIG. 1 is block diagram of an exemplary image capture device that is configured to implement techniques of this disclosure.

This disclosure describes image processing techniques that account for and/or compensate for display shading caused by a camera sensor being disposed below at least a portion of a display. The display may use a transparent material with a pixel structure designed so that light can penetrate through the display to the camera sensor. A camera sensor used in such a manner may be larger than other front-facing "selfie" cameras and may have a wider aperture lens. For example, the camera sensor size need not be limited or constrained by bezel or border space surrounding the display. By locating a camera sensor under a display on a device such that the camera sensor may receive light through at least a portion of the display, the size of the usable display space may be enlarged when compared to a similar sized device with space on the front of the device dedicated for a camera sensor. Alternatively, a smaller form factor may be used to provide the same usable display size. Additionally, by locating a camera sensor under a display, the camera sensor may be placed anywhere under the display. For example, the camera sensor may be located where a user's eyes may be directed to when taking a "selfie." In this manner, the gaze of the eyes in the image captured by the camera sensor may appear to be looking at the camera and not under the camera as may occur with camera sensors being located above the display or near the top of the image capture device.

In many image capture devices, it may be desirable to maximize the size of the display on the image capture device. This is particularly the case with smaller image capture devices, such as mobile phones and other mobile devices. Many image capture devices (e.g., mobile devices) include a front-facing camera (a "selfie" camera) that faces towards the user of the mobile device. Maximizing display size on image capture devices with a front-facing camera(s) is not without limitations. Front-facing cameras have been located on the front face of an image capture device between the edge of the device and the edge of the display. To maximize display size on image capture devices having front-facing cameras, some manufacturers have enlarged the display and introduced a notch in the display to avoid covering the camera sensor with the display. Others have enlarged the display to substantially cover the front face of the image capture device and added a pop-up camera rather than place the camera sensor on the body of the image capture device.

One way to maximize display size is to locate a camera sensor under the display. However, by locating the camera sensor under the display, the display may cause attenuation, spatial strides and shadows, light scattering or diffusion, and/or other undesirable effects in the image signal captured by the camera sensor. For example, haze, glare and/or color cast may impact the quality of image being captured. These issues may be compounded as the display ages. For example, current used to drive sub-pixels can cause the sub-pixels to lose brightness (e.g., dim). In the case where the region of the display directly over the camera sensor is being used to display content, the impact on image quality may be more severe. For example, some or all of the sub-pixels directly above the camera sensor may be actively displaying content and the camera sensor may capture light scattering from the display content when capturing the image. In general, the aforementioned undesirable effects of using an under-display camera may be referred to as display shading.

This disclosure describes techniques for display shade compensation. The display shade compensation techniques of this disclosure may use the features of the physical layout of the transparent display, the characteristics of the content being display above the camera sensor, as well as the aging status of the pixels above the camera sensor to compensate for the display shading experienced in any captured images.

This disclosure also describes UI techniques for managing the display in low light situations. For example, in low light situations, less light may pass through the display to an under-display camera sensor than in high light situations. This disclosure describes techniques to improve transmittance through the display so that the camera sensor may receive sufficient light to capture an aesthetically pleasing image.

FIG. 1 is a block diagram illustrating a device 2 that may be configured to perform the techniques of this disclosure. Device 2 may form part of an image capture device, or a digital video device capable of coding and transmitting and/or receiving still images and/or video sequences. By way of example, device 2 may form part of a wireless mobile communication device such as a cellular phone or satellite radio phone, a smartphone, a stand-alone digital camera or video camcorder, a personal digital assistant (PDA), a tablet computer, a laptop computer, or any device with imaging or video capabilities in which image processing is desirable.

As shown in FIG. 1, device 2 includes an image processing apparatus 4 to store raw image data and perform various processing techniques on such data. Image processing apparatus 4 may comprise one or more integrated circuits that include a digital signal processor (DSP), on-chip memory, and possibly hardware logic or circuitry. More generally, image processing apparatus 4 may comprise any combination of processors, hardware, software or firmware, and the various components of image processing apparatus 4 may be implemented as such. Also, image processing apparatus 4 may comprise a single integrated chip or an encoder/decoder (CODEC), if desired.

In the illustrated example of FIG. 1, image processing apparatus 4 includes a local memory 8, a memory controller 10 and an image signal processor 6. Image signal processor 6 may be a general-purpose processing unit or may be a processor specially designed for imaging applications, for example, for a handheld electronic device. As shown, image signal processor 6 is coupled to local memory 8 and external memory 14 via memory controller 10. In some examples, local memory 8 may be incorporated in image signal processor 6, for example, as cache memory.

As shown in FIG. 1, image signal processor 6 may be configured to execute an auto exposure control (AEC) process 20, an auto white balance (AWB) process 22, an auto focus (AF) process 24, a display shade compensation (DSC) process 26, a lens shade compensation (LSC) process 28 and/or a fixed pattern noise compensation (FPNC) process 30. In some examples, image signal processor 6 may include hardware-specific circuits (e.g., an application-specific integrated circuit (ASIC)) configured to perform the AEC process 20, AWB process 22, AF process 24, DSC process 26, LSC process 28 and/or FPNC process 30. In other examples, image signal processor 6 may be configured to execute software and/or firmware to perform the AEC process 20, AWB process 22, AF process 24, DSC process 26, LSC process 28 and/or FPNC process 30. When configured in software, code for AEC process 20, AWB process 22, AF process 24, DSC process 26, LSC process 28 and/or FPNC process 30 may be stored in local memory 8 and/or external memory 14. In other examples, image signal processor 6 may perform the AEC process 20, AWB process 22, AF process 24, DSC process 26, LSC process 28 and/or FPNC process 30 using a combination of hardware, firmware, and/or software. When configured as software, AEC process 20, AWB process 22, AF process 24, DSC process 26, LSC process 28 and/or FPNC process 30 may include instructions that configure image signal processor 6 to perform various image processing and device management tasks, including the DSC techniques of this disclosure.

AEC process 20 may include instructions for configuring, calculating, storing, and/or applying an exposure setting of a camera module 12. An exposure setting may include the shutter speed and aperture setting to be used to capture images. In accordance with techniques of this disclosure, image signal processor 6 may use depth information captured by camera module 12 to better identify the subject of an image and make exposure settings based on the identified subject. AF process 24 may include instructions for configuring, calculating, storing, and/or applying an auto focus setting of camera module 12.

AWB process 22 may include instructions for configuring, calculating, storing and/or applying an AWB setting (e.g., an AWB gain) that may be applied to one or more images captured by camera module 12. In some examples, the AWB gain determined by AWB process 22 may be applied to the image from which the AWB gain was determined. In other examples, the AWB gain determined by AWB process 22 may be applied to one or more images that are captured after the image from which the AWB gain was determined. Hence, AWB gain may be applied to a second image captured subsequently to the first image from which the AWB gain is determined. In one example, the second image may be the image captured immediately after the first image from which the AWB gain was determined. That is, if the first image is frame N, the second image to which the AWB gain is applied is frame N+1. In other examples, the second image may be the image captured two images after the first image from which the AWB gain was determined. That is, if the first image is frame N, the second image to which the AWB gain is applied is frame N+2. In other examples, the AWB gain may be applied to images captured further in time from the first image (e.g., frame N+3, frame N+4, etc.). In other examples, the AWB gain may be applied to first image from which the AWB gain is determined.

DSC process 26 may include instructions configuring, calculating, storing and/or applying a display shade compensation gain. For example, DSC process 26 may receive first image data captured by a camera sensor. The camera sensor may be disposed below at least a portion of a display. DSC process 26 may receive at least a portion of display content, determine an adjustment matrix, such as a two-dimensional gain matrix, based on preset parameters, the at least a portion of content displayed, and/or the aging status of the pixels above the camera sensor, and apply the adjustment matrix to the first image data to create second image data and output the second image data. The preset parameters may be indicative of a shape, size or location of sub-pixels in a display and may represent compensation parameters used to compensate for issues such as shading or color tinting caused by the display sub-pixel layout (e.g., the size, shape and location of sub-pixels in the display). In some examples, the preset parameters may also be indicative of a location of active pixels in the display and may represent compensation based on zoning control (e.g., in which a subset of pixels of all the pixels in a given area may be actively displaying content). In some examples, the preset parameters may be determined using a gray color checker card as described below with respect to FIGS. 8A-8C to generate a plurality of adjustment matrices and DSC process 26 may compensate for the at least a portion of content displayed by computing an average of the sum of the sub-pixel values (e.g., (R+G+B)/number of pixels*3) (such as those above the camera sensor) and using the average as an index to select or adjust one of the adjustment matrices. As used herein, an average is an example of a statistical measure.

LSC process 28 may include instructions for configuring, calculating, storing and/or applying a lens shade compensation gain. For example, LSC process 28 may compensate for light falling-off towards the edges of an image due to a camera lens.

FPNC process 30 may include instructions for configuring, calculating, storing and/or applying an FPN compensation process. For example, FPNC process 30 may subtract a master dark frame from the captured image to compensate for FPN.

Local memory 8 may store raw image data and may also store processed image data following any processing that is performed by image signal processor 6. Local memory 8 may be formed by any of a variety of non-transitory memory devices, such as dynamic random-access memory (DRAM), including synchronous DRAM (SDRAM), magnetoresistive RAM (MRAM), resistive RAM (RRAM), or other types of memory devices. Memory controller 10 may control the memory organization within local memory 8. Memory controller 10 also may control memory loads from local memory 8 to image signal processor 6 and write backs from image signal processor 6 to local memory 8. The images to be processed by image signal processor 6 may be loaded directly into image signal processor 6 from camera module 12 following image capture or may be stored in local memory 8 during the image processing.

As noted, device 2 may include a camera module 12 to capture the images that are to be processed, although this disclosure is not necessarily limited in this respect. Camera module 12 may comprise arrays of solid-state sensor elements such as complementary metal-oxide semiconductor (CMOS) sensor elements, charge coupled device (CCD) sensor elements, or the like. Alternatively, or additionally, camera module 12 may comprise a set of image sensors that include color filter arrays (CFAs) arranged on a surface of the respective sensors. Camera module 12 may be coupled directly to image signal processor 6 to avoid latency in the image processing. Camera module 12 may be configured to capture still images, or full motion video sequences, in which case the image processing may be performed on one or more image frames of the video sequence.

Camera module 12 may send pixel values (e.g., in a Bayer or RGB format), and/or raw statistics messages describing the captured image to image signal processor 6. The information obtained from camera module 12 may be used in the DSC process 26, as will be described in more detail below.

In general, image signal processor 6 may be configured to analyze the raw statistics and depth information to calculate and/or determine imaging parameters, such as sensor gain, R/G/B gain, AWB gain, shutter speed, aperture size, and the like. The calculated and/or determined imaging parameters may be applied to the captured image, applied to one or more subsequently captured images, and/or sent back to camera module 12 to adjust exposure and/or focus setting.

Device 2 may include a display 16 that displays an image following the image processing described in this disclosure. After such image processing, the image may be written to local memory 8 or external memory 14. The processed images may then be sent to display 16 for presentation to the user. Display 16 may display other information, including visual representations of files stored in a memory location (e.g., external memory 14), software applications installed in image signal processor 6, user interfaces, network-accessible content objects, and other information.

In some examples, device 2 may include multiple memories. For example, device 2 may include external memory 14, which typically comprises a relatively large memory space. External memory 14, for example, may comprise DRAM or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise SDRAM. In any case, external memory 14 and local memory 8 are merely exemplary, and may be combined into the same memory part, or may be implemented in any number of other configurations. In some examples, external memory 14 may store a first UI and a second UI. For example, the first UI may display black pixels in a region above an under-display camera sensor and the second UI may display non-black pixels in the region above the under-display camera sensor.

Device 2 may also include a transmitter (not shown) to transmit the processed images or coded sequences of images to another device. Indeed, the techniques of this disclosure may be used in handheld wireless communication devices (such as smartphones) that include digital camera functionality or digital video capabilities. In that case, the device would also include a modulator-demodulator (MODEM) to facilitate wireless modulation of baseband signals onto a carrier waveform in order to facilitate wireless communication of the modulated information.

Local memory 8, display 16 and external memory 14 (and other components if desired) may be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

FIGS. 2A-2D are block diagrams showing examples of image capture devices (such as smartphones). Each image capture device is depicted with a display and a front-facing camera sensor. In this context, a front-facing camera sensor is a camera sensor that faces the user of image capture device in typical operation. For example, a front-facing camera sensor is typically on the same side of the device as the main display. Each front-facing camera sensor may be a part of a camera module, such as camera module 12. For example, in FIG. 2A, image capture device 200 includes display 202, camera sensor 204 and button 206. Button 206 may serve multiple purposes, such as to wake up image capture device 200, change what is being displayed on display 202, etc. As can be seen, button 206 and camera sensor 204 take up space on the front of image capture device 200. By locating camera sensor 204 and button 206 on the front of image capture device 200, less area is available for display 202.

Figure 2D:
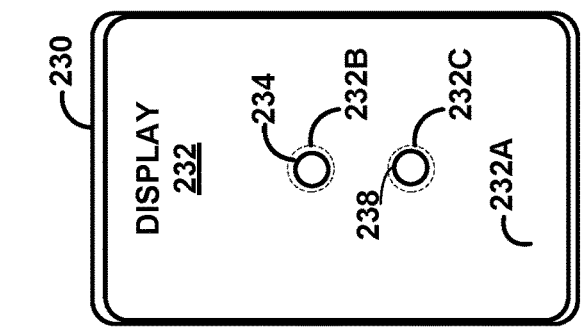
FIGS. 2A-2D are block diagrams showing examples of image capture devices having front-facing camera sensors and displays.
Figure 2C:
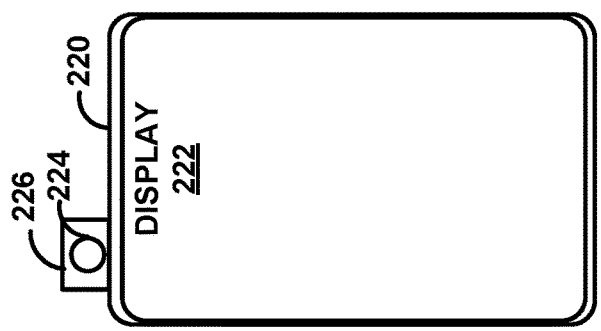
Figure 2B:
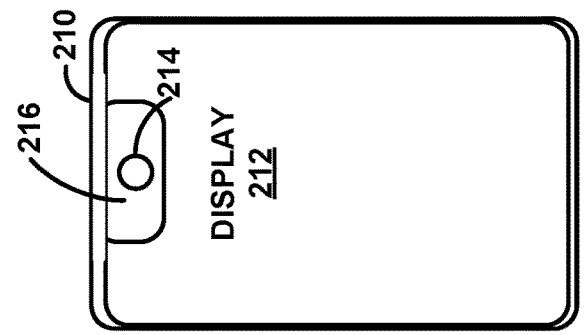
Figure 2A:
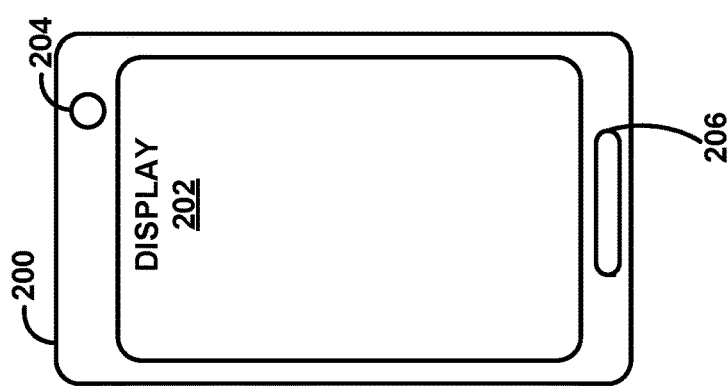

In the example of FIG. 2B, image capture device 210, on the other hand does not have a button on the front. In this case the button may be on the side or the functions of the button may be included in display 212 (e.g., through a touch display interface). Image capture device 210 is depicted with camera sensor 214 and notch 216. Notch 216 may be an area removed from the display before assembly of image capture device 210. In this example, the area covered by notch 216 is therefore not part of display 212 and does not display content. Notch 216 may be employed in order to increase the ratio of front side of image capture device 210 occupied by display 212 when compared to image capture device 200 of FIG. 2A.

In the example of FIG. 2C, image capture device 220 has a display 222 and a pop-up camera 226. Camera sensor 224 may be contained in pop-up camera 226. In the example of image capture device 220, the entirety of display 222 may display content and there is no notch, such as in image capture device 210 of FIG. 2B.

In the example of FIG. 2D, image capture device 230 has a display 232 and a camera sensor 234. In some examples, image capture device 230 may have more than one camera sensor. For example, image capture device 230 may have camera sensor 234 and camera sensor 238. Image capture device 230 may comprise or be an example of device 2 and display 232 may be an example of display 16. In the example of image capture device 230 of FIG. 2D, unlike the examples of FIGS. 2A-2C, camera sensor 234 and camera sensor 238 are disposed below display 232. In some examples, a portion of, rather than all of, camera sensor 234 or camera sensor 238 may be disposed below display 232. Display 232 may comprise transparent layers. Region 232A of display 232, 232B of display 232, and region 232C of display 232 will be discussed further with respect to FIGS. 5, 7, and 9. While the techniques of this disclosure are generally described with reference to an image capture device with a camera sensor disposed below a display, such as image capture device 230, the techniques of this disclosure may be used with other image capture devices, such as image capture devices 200, 210 and 220 or an image capture device with a camera sensor partially disposed under a display.

Referring now to each of FIGS. 2A-2D, image capture device 200 has a larger form factor than image capture devices 210, 220 and 230, but has the same size display 202 as display 222 of image capture device 220 and display 232 of image capture device 230 and a slightly larger display 202 than display 212 of image capture device 210 due to notch 216. Image capture device 210 has the same size form factor as image capture devices 220 and 230, but it has less usable display space on display 212 due to notch 216. Additionally, notch 216 may be distracting to some users. Image capture device 220 has the same form factor and usable display size as image capture device 230, however image capture device 220 has moveable parts in pop-up camera 226. These moveable parts may become broken or jammed with repeated use or with a user dropping image capture device 220 onto a hard surface. Therefore, it may be desirable to locate the camera sensor beneath the display as locating the camera sensor under the display may maximize display space while avoiding notching and moving mechanical parts.

Additionally, with image capture device 230 of FIG. 2D, camera sensor 234 may be located anywhere underneath display 232. In this example, camera sensor is shown located in the middle of display 232. Such a location may be desirable over the locations of the front-facing camera sensors in image capture device 200, image capture device 210 and image capture device 220. For example, a user trying to take a "selfie" may look at a live image of themselves on the display of the image capture device. The further the camera sensor is away from where the user's eyes are pointed, the more likely the image that will be captured will depict the eyes gazing away from the camera sensor. This eye gaze phenomenon may result in aesthetically unappealing images with the user's gaze appearing below (or above) where one may expect them to be looking (e.g., not towards the eyes of the viewer of the image, but downwards (or upwards) from the eyes of the viewer of the image, such as under or over the head of the viewer of the image).

Figure 3:
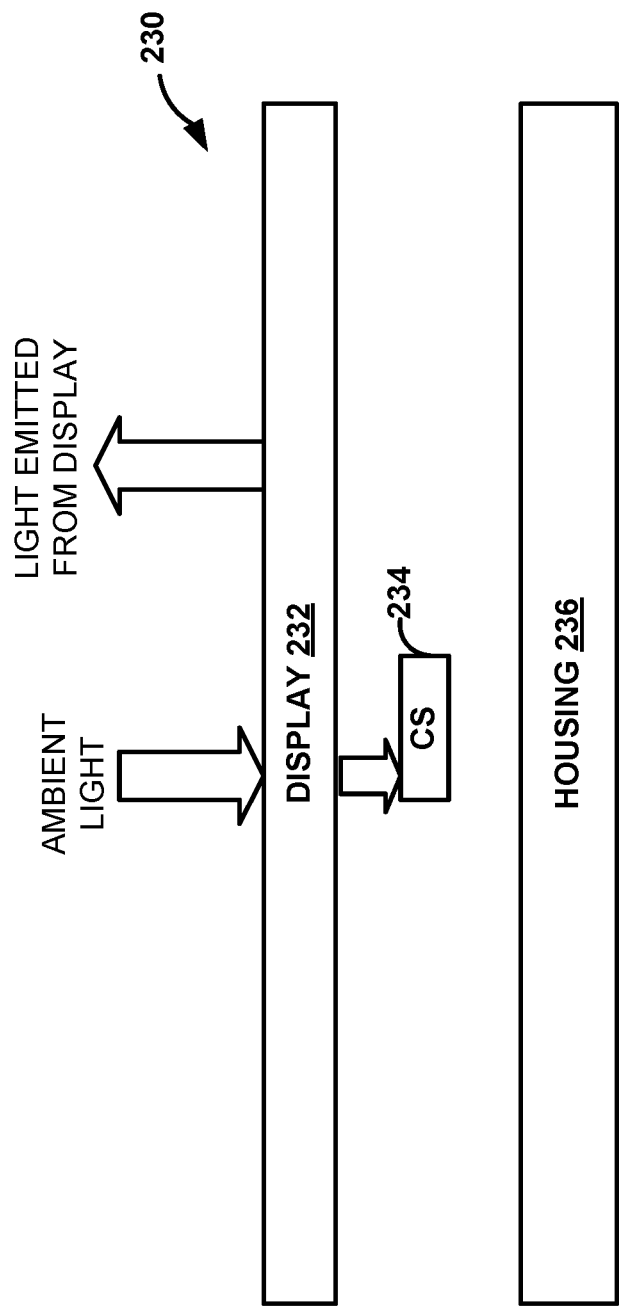
FIG. 3 is a block diagram showing an exploded view of an example image capture device that is configured to implement techniques of this disclosure.

FIG. 3 is a block diagram of an exploded side view of an example of image capture device 230 as shown in FIG. 2D. For simplicity purposes, camera sensor 238 is not shown in FIG. 3 or the remaining figures and may function similarly to camera sensor 234 as described herein. In the example of FIG. 3, image capture device 230 includes display 232, camera sensor (CS) 234 and housing 236. Housing 236 may include electronic circuit boards, processors, memory, battery, radio frequency circuitry, antennas and other components. As shown, display 232 is disposed above camera sensor 234 and camera sensor 234 is disposed below or beneath display 232. In this example, as in FIG. 2D, camera sensor 234 is a front facing camera. Camera sensor 234 is configured to capture images by capturing ambient light passing through display 232. That is to say, camera sensor 234 may receive ambient light that passes through at least a portion of display 232 before being incident on camera sensor 234. As used herein, the camera sensor being under, below or beneath the display or the display being over the camera sensor is intended to describe the camera sensor being configured and located so as to capture images by capturing ambient light passing through the display, such as display 232. Display 232 may emit light towards a user and generally away from camera sensor 234 when displaying content. Camera sensor 234 may be actively capturing image(s) while or when display 232 is actively displaying content. In other words, camera sensor 234 may receive ambient light passing through at least a portion of display 232 while display 232 may emit light towards a user.

Figure 4B:
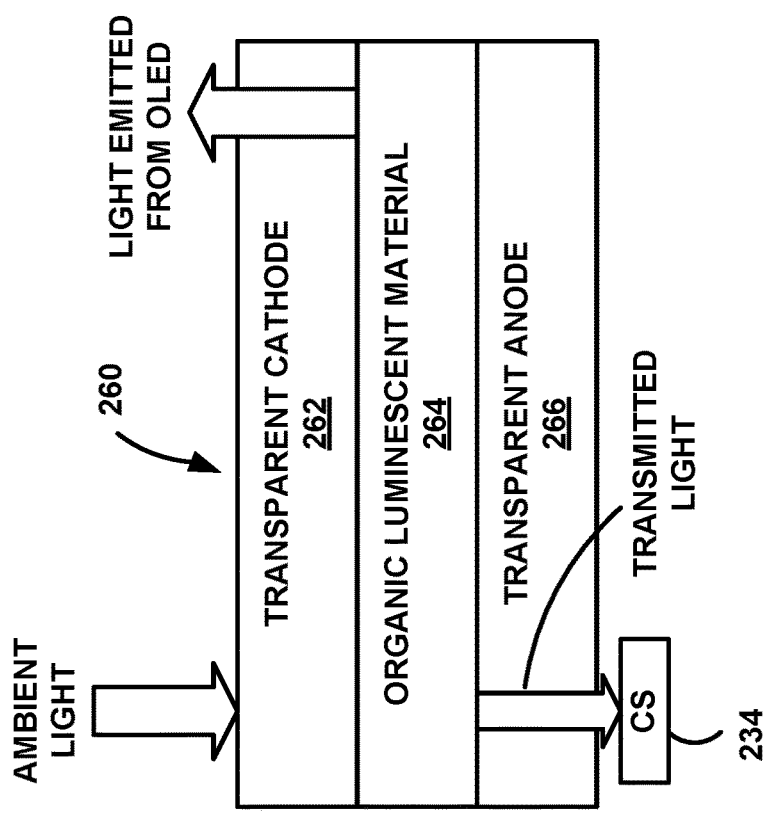
FIGS. 4A-4B are block diagrams illustrating properties of different example OLED displays according to techniques of this disclosure.
Figure 4A:
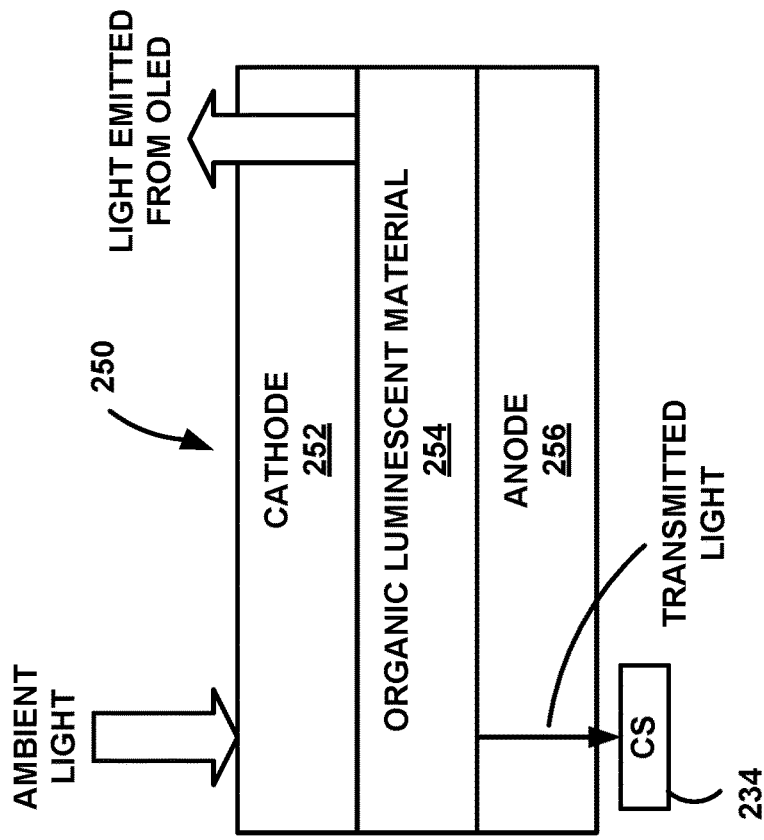

FIGS. 4A and 4B are simplified diagrams of example OLED displays that may be used in accordance with the techniques of this disclosure. While the displays of FIGS. 4A and 4B are depicted as OLED displays, the techniques of this disclosure may be used with any displays that are configured to allow light to pass through the display to a camera sensor located underneath the display, such as LCD, LED, AMOLED, or other displays. In FIGS. 4A and 4B, while the example OLED displays are depicted with three layers, OLED displays may consist of more layers.

In the example of FIG. 4A, OLED display 250 includes cathode layer 252, organic luminescent material layer 254, and anode layer 256. For example, OLED display 250 may emit light when current is run between cathode layer 252 and anode layer 256 through organic luminescent material layer 254 causing an image(s) to appear on OLED display 250. In this manner, organic luminescent material layer 254 may emit light through cathode layer 252 towards a user. In some examples, camera sensor 234 may receive ambient light at the same time that organic luminescent material layer 254 may emit light. In the example of FIG. 4A, the ambient light may strike the face of cathode layer 252. A portion of this ambient light may pass through cathode layer 252, organic luminescent material layer 254 and anode layer 256. In this example, cathode layer 252 and anode layer 256 may not be transparent. Additionally, organic luminescent material layer 254 may have RGB, RGBW, WRGB (where W is white), RGBG or other sub-pixels that may obstruct, attenuate or distort ambient light from passing through organic luminescent material layer 254. Therefore, the amount of ambient light that passes through OLED display 250 may be relatively small (shown as transmitted light). As such, camera sensor 234 receiving the transmitted light beneath OLED display 250 may not receive very much of transmitted light as represented by the thin arrow. This may lead to poor image quality of images captured by the camera sensor.

In the example of FIG. 4B, OLED display 260 includes transparent cathode layer 262, organic luminescent material layer 264 and transparent anode layer 266. As in the example of FIG. 4A, OLED display 260 may emit light when current is run between transparent cathode layer 262 and transparent anode layer 266 through organic luminescent material layer 264 causing an image(s) to appear on OLED display 260. In this manner, organic luminescent material layer 264 may emit light through transparent cathode layer 262 towards a user. In example of FIG. 4B, much more of the ambient light may be transmitted through OLED display 260 to camera sensor 234 because both transparent cathode layer 262 and transparent anode layer 266 are transparent. Camera sensor 234 may receive the ambient light that passes through at least a portion of OLED display 260 before being incident on camera sensor 234 (shown as transmitted light as represented by the thick arrow). In some examples, camera sensor 234 may receive the ambient light at the same time that organic luminescent material layer 264 may emit light. In the example of FIG. 4B, like in the example of FIG. 4A, organic luminescent material layer 264 may contain RGB, RGBW or WRGB sub-pixels that may obstruct, attenuate or distort the ambient light passing through organic luminescent material layer 264. Overall, the attenuation or distortion in the example of FIG. 4B may be less than that of FIG. 4A, for example, due to transparent cathode layer 262 and transparent anode layer 266 being transparent. However, by running current between cathode layer 252 and anode layer 256, OLED display 250 may age which may result in a decrease in transparency over time.

Figure 5:
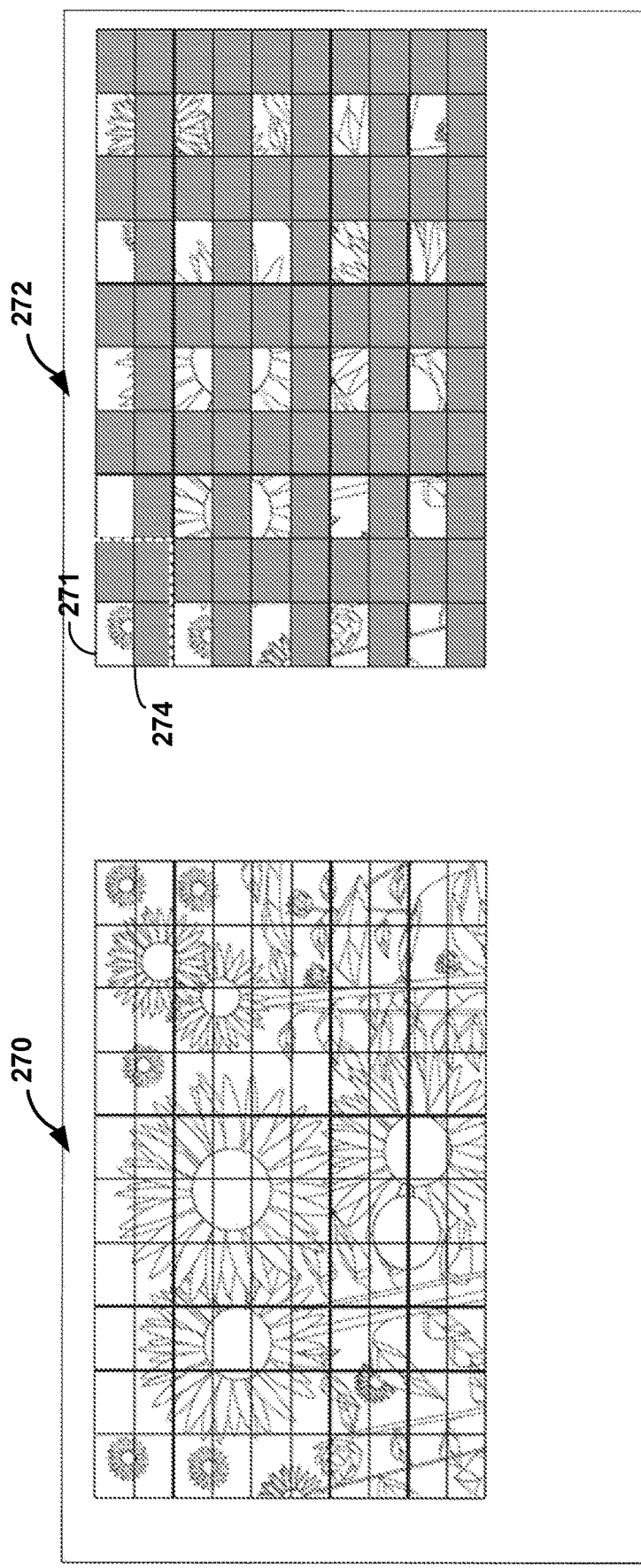
FIG. 5 is a conceptual diagram showing an example of zoning control that may be used with techniques of this disclosure.

FIG. 5 is a conceptual diagram depicting an example of zoning control that may be used in accordance with techniques of this disclosure. With zoning control, one region or zone of a display actively uses all pixels of the one region or zone to display content while another region or zone of the display may actively use only some of the pixels of the another region or zone to display content. FIG. 5 depicts two different views of an image which may be displayed with each box within each view representing a pixel in a display. View 270 depicts an image that may be displayed in a region of a display, such as display 232, which may not be located above a camera sensor, such as camera sensor 234. In FIG. 2D, this region of the display is shown as region 232A. All of the pixels in region 232A may be utilized to display content, such as shown in view 270.

View 272 depicts an image that may be displayed in a region of a display above a camera sensor, such as region 232B or region 232C of FIG. 2D. In view 272, a subset of pixels is actively displaying content. In some examples, region 232B may be the same size as camera sensor 234. In other examples, region 232B may be a different size than camera sensor 234. In some examples, region 232C may be the same size as camera sensor 238. In other examples, region 232C may be a different size than camera sensor 238. In some examples, region 232B or region 232C may be determined in a laboratory. In some examples, region 232B or region 232C may be determined by optics path(s) which affects the camera sensor (e.g., camera sensor 234 or camera sensor 238). For example, a scientist or engineer may test various layouts of region 232B or region 232C and select a layout that balances the aesthetics of the display and the ability of light to pass through the display to camera sensor 234 or camera sensor 238.

In the example of view 272, the location of active pixels that display 232 utilizes is the top left pixel (e.g., pixel 271) of every group of four pixels (e.g., group 274 separated from the other groups of four pixels by dashed white lines) to display content and the other pixels of each group of four pixels are not utilized. This particular configuration is a non-limiting example. Other configurations may be utilized in accordance with the techniques of this disclosure.

In some examples, view 272 may be displayed in region 232B above camera sensor 234 only when camera sensor 234 is actively being used to capture an image(s) and view 270 (e.g., using all the pixels) may be displayed in region 232A. In some examples, view 272 may be displayed in region 232C above camera sensor 238 only when camera sensor 238 is actively being used to capture an image(s) and view 270 (e.g., using all the pixels) may be displayed in region 232A. In some examples, view 270 (e.g., using all the pixels) may be used in region 232A, region 232B, and region 232C when camera sensor 234 is not actively being used to capture an image(s). For example, view 272 may be displayed in region 232B when an image capture application (e.g., a camera app or video app) is being executed by device 2.

View 272 may be desirable to display in region 232B when camera sensor 234 is actively being used to capture an image(s) to reduce light scattering and distortion of the ambient light that may be caused by display content and captured by camera sensor 234. Thereby, a subset of pixels in region 232B may be active when camera sensor 234 is actively capturing an image(s) or a subset of pixels in region 232C may be active when camera sensor 238 is actively capturing an image(s). By reducing the number of pixels above camera sensor 234 (or camera sensor 238) displaying content during image capture, light scattering and distortion in the captured image may be reduced.

In some examples, view 272 may not be displayed in region 232B when camera sensor 234 is actively being used to capture an image(s) or may not be displayed in region 232C when camera sensor 238 is actively being used to capture an image(s). For example, it may be more desirable to display all pixels (view 270) over all of display 232 (region 232A, region 232B, and region 232C).

Figure 6:
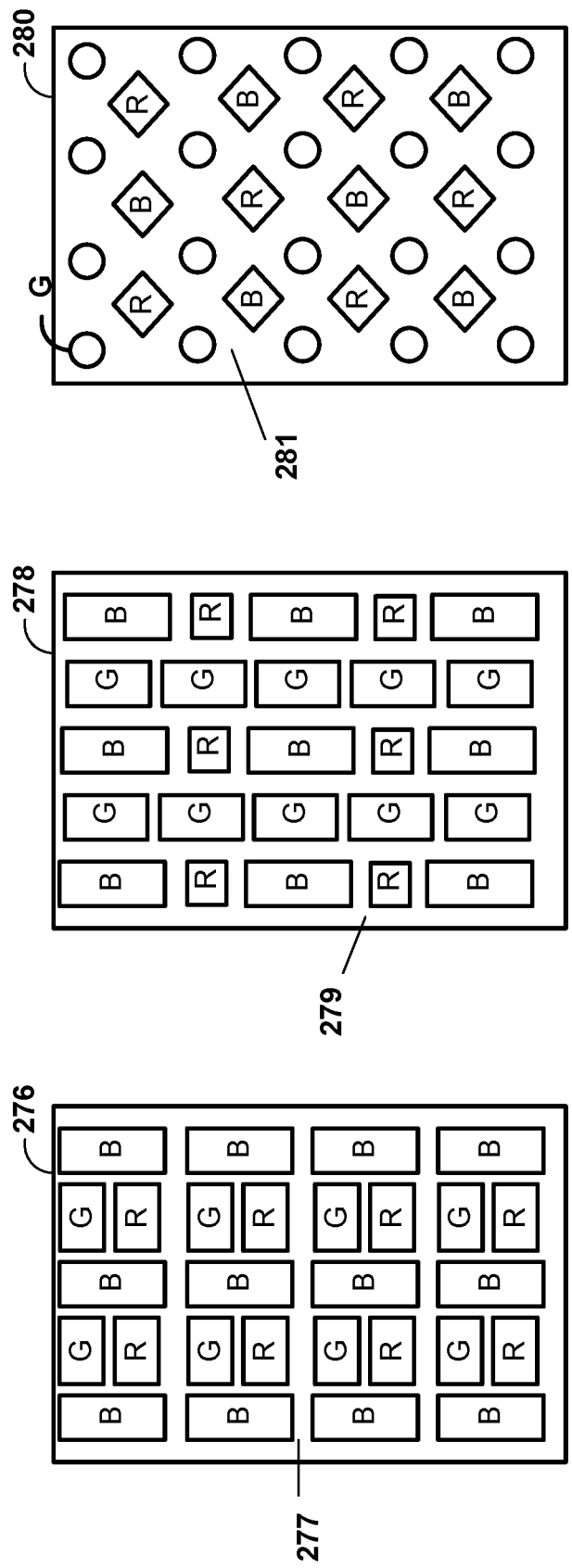
FIGS. 6A-6C are conceptual diagrams showing possible physical layouts of RGB sub-pixels in a display.

FIGS. 6A-6C are conceptual diagrams depicting example layouts of sub-pixels in a display according to techniques of the present disclosure. As mentioned above, a sub-pixel is an element of a pixel, such as a red, blue or green element of an RGB pixel. While the examples of FIGS. 6A-6C illustrate RGB sub-pixels, a display may contain an RGBW, a WRGB, or other sub-pixel layout. In the example of FIG. 6A, layout 276 includes three columns of blue (B) sub-pixels as shown. Between each column of blue sub-pixels is a column of alternating green (G) and red (R) sub-pixels. In between the sub-pixels there is space 277. In the example of FIG. 6B, layout 278 includes two columns of green (G) sub-pixels as shown. On either side of the green sub-pixel columns is a column of alternating blue (B) and red (R) sub-pixels. In between the sub-pixels there is space 279. In the example of FIG. 6C, layout 280 includes a number of rows of circular shaped sub-pixels. Each of these sub-pixels may be a green (G) sub-pixel. Between the rows of green sub-pixels are diamond shaped alternating red (R) sub-pixels and blue (B) sub-pixels. Between the sub-pixels is space 281. FIGS. 6A-6C are just a few examples of potential layouts of sub-pixels in a display. The shape, size, and location of the sub-pixels is a matter of design choice by a manufacturer of a display. Therefore, the layout of sub-pixels may vary from one manufacturer or one type of display to the next. Information relating to the layout (e.g., shape, size and location) of the sub-pixels may be available from the manufacturer of the display.

When a camera sensor, such as camera sensor 234, is located beneath a display, such as display 232, camera sensor 234 may receive ambient light through the space (e.g., space 277, space 279, or space 281) between sub-pixels. For example, one or more camera sensors may be disposed below or underneath at least a portion of a display layer such that light passes through the display layer prior to being received by the one or more sensors. Although the light may pass through the display layer prior to being received by the one or more camera sensors, such as camera sensor 234, the sub-pixels may shade portions of camera sensor 234 and may cause problems like haze, glare and/or color cast in a captured image(s). Additionally, as discussed above, displaying content above a camera sensor, such as camera sensor 234 may also impact image quality due to light scattering of the display content that may be captured by camera sensor 234. The display shading compensation techniques of this disclosure may compensate for shading caused by the sub-pixels and light scattering caused by the display content, thereby improving image quality in images captured by an image capture device having a camera sensor beneath a display.

Figure 7:
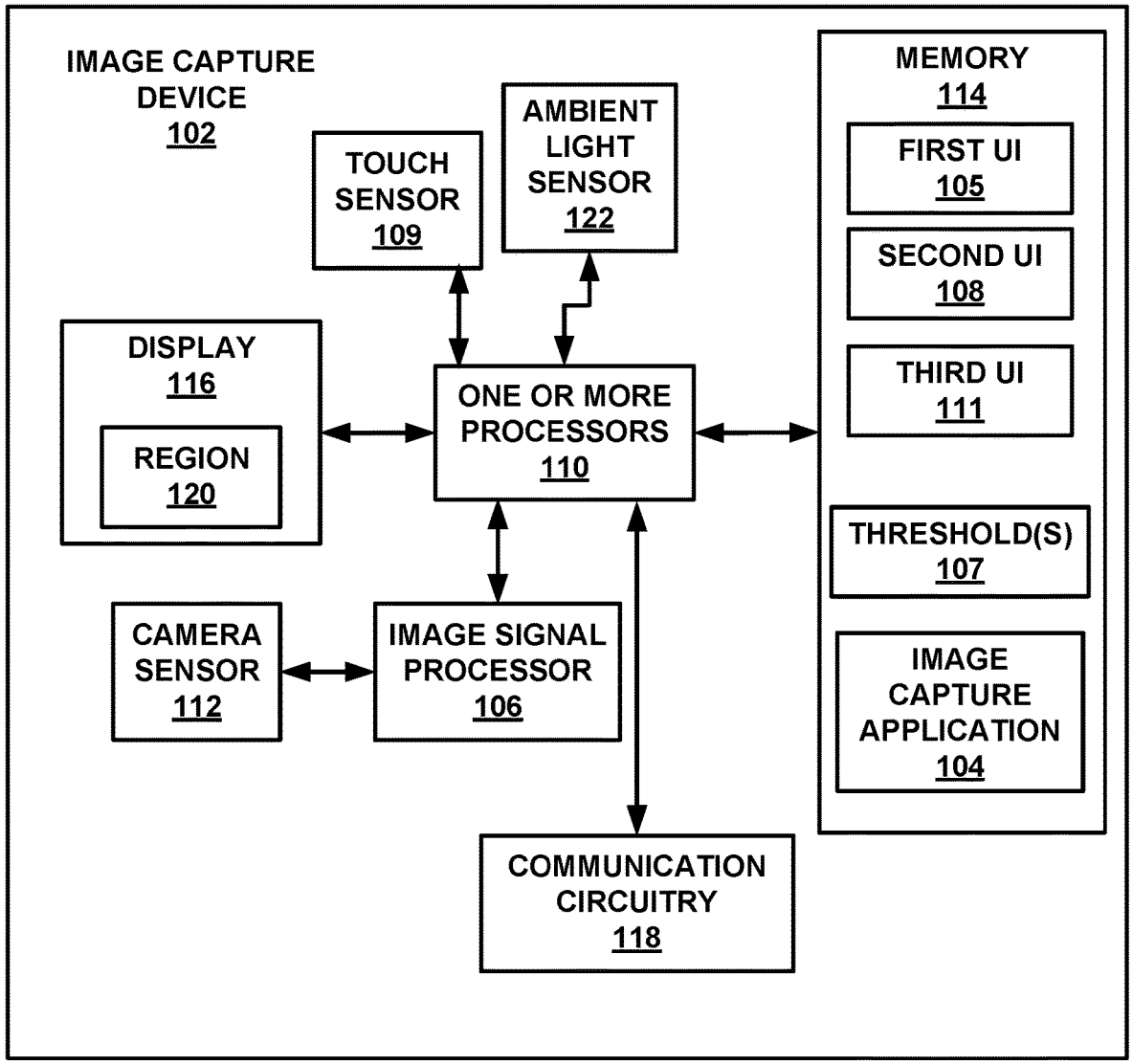
FIG. 7 is a block diagram of an example image capture device that may implement the techniques of this disclosure.

FIG. 7 is a block diagram of an example image capture device that may implement the techniques of this disclosure. Image capture device 102 may be an example of device 2 of FIG. 1. By way of example, image capture device 102 may comprise a wireless mobile communication device such as a cellular phone or satellite radio phone, a smartphone, a stand-alone digital camera or video camcorder, a personal digital assistant (PDA), a tablet computer, a laptop computer, or any device with imaging or video capabilities in which image processing is desirable.

Image capture device 102 may include one or more processors 110, camera sensor 112, image signal processor 106, memory 114, display 116, communication circuitry 118, and ambient light sensor 122. Display 116 may include a region 120 (which may be an example of region 232B or region 232C of FIG. 2D) located over camera sensor 112 such that camera sensor receives light through region 120. In some examples, image signal processor 106 may be one of one or more processors 110. In some examples, image signal processor 106 may be more than one of one or more processors. In some examples, image signal processor 106 may be separate from one or more processors 110, as depicted.

Memory 114 may include an image capture application 104. Image capture application 104 may be an application utilized by a user to turn on the camera functionality of image capture device 102. Memory 114 may also store a first camera UI (first UI 105), a second camera UI (second UI 108), and predetermined threshold(s) (threshold(s) 107). In some examples, memory 114 may also a third camera UI (third UI 111). Memory 114 may also be configured to store pixel values relating to an image captured by camera sensor 112. Memory 114 may also store instructions for causing one or more processors 110 to perform the techniques of this disclosure.

Camera sensor 112 may capture pixel values of an image when activated. For example, when one or more processors 110 are executing image capture application 104, camera sensor 112 may capture pixel values. Image signal processor 106 may process the pixel values captured by camera sensor 112.

One or more processors 110 may obtain the pixel values from image signal processor 106 and may provide the pixel values to memory 114 for storage, to communication circuitry 118 for transmittal to another device, or provide the pixel values to display 116 for display to a user. When the camera is off (e.g., when one or more processors 110 are not executing image capture application 104), one or more processors 110 may obtain the pixel values from memory 114, for example, and provide the pixel values to display 116 for display.

In some examples, according to the techniques of this disclosure, image capture device 102 includes display 116 configured to display captured images. Image capture device 102 includes camera sensor 112. Camera sensor 112 is disposed to receive light through at least a portion of the display. Image capture device 102 includes memory 114 configured to store captured images. Image capture device 102 includes one or more processors 110 coupled to camera sensor 112, display 116, and memory 114. One or more processors 110 are configured to receive a signal from a sensor. One or more processors 110 are configured to determine, based at least in part on the signal, a user interface mode, the user interface mode comprising a first mode (e.g., first UI 105) and a second mode (e.g., second UI 108), wherein the first mode comprises a first number of black pixels in a region of the display and the second mode comprises a second number of black pixels in the region of the display, the first number being greater than the second number. One or more processors 110 are also configured to receive image data from camera sensor 112.

Environmental illuminance (e.g., ambient light) may be important to an under-display camera sensor, such as camera sensor 112, as environmental illuminance may affect auto exposure control, auto focus, and auto white balance in image capture device 102. For example, in a dark, low lux environment, an image captured by camera sensor 112 may be relatively poor. For example, if the environment lux is 8000 lux, camera sensor 112 may function well with proper calibration. If the environment lux is 20 lux, an image captured by camera sensor 234 may be poor and may require complex tuning to improve the image. If the environment lux is 0.2 lux and a flash is not used, an image captured by camera sensor 234 may be so poor that the image may not be repairable.

According to the techniques of this disclosure, image capture device 102 in a first mode may display black pixels in region 120 above camera sensor 112, for example, in a low lux environment. As used herein "black pixels" include pixels having a grayscale value of 0, blank pixels, or unaddressed pixels. By displaying black pixels in region 120 above camera sensor 112, the transmittance of display 116 in region 120 may improve and thereby benefit auto exposure control, auto focus, and auto white balance (which may be part of image signal processor 106) of image capture device 102. However, always displaying black pixels in region 120 may interfere with a normal display UI and may be aesthetically unpleasant to a user of image capture device 102. Therefore, it may be desirable to provide a technique for displaying black pixels in region 120 over camera sensor 112 only during low lux environments.

One technique to control the selection of a UI may be an auto exposure control-based (AEC) technique. AEC may use histogram statics of sequential frames and input pixel dynamic range analysis to control camera sensor gain and exposure time. AEC may utilize 5-15 frames of data to determine a proper gain-exposure time balance setting. Additionally, the AEC procedure is affected by the pixel values in region of the display above the camera sensor.

In some examples, once image capture application 104 is launched, one or more processors 110 through, for example, image capture application 104, a system camera service, or a camera hardware abstraction layer (HAL) may use ambient light sensor 122 to check an environment lux value. If the environment lux value is greater than a predetermined threshold, the ambient light may be considered high. In this case, display transmittance is not necessarily critical. As such, one or more processors 110 may launch second UI 108.

If the environment lux value is less than the predetermined threshold, the ambient light may be considered low. In this case, the display transmittance may be more important for proper image acquisition. As such, one or more processors 110 may launch the first UI 105. This means the pixels of the region of the display above the camera sensor may be a 0 pixel value to increase the transmittance of the region of the display above the camera sensor.

For example, when the camera is on (e.g., when one or more processors 110 are executing image capture application 104), one or more processors 110 may determine an ambient light level. For example, one or more processors may query ambient light sensor 122 to determine the ambient light level. Ambient light sensor 122 may be configured to sense an ambient light level. One or more processors 110 may determine whether the ambient light level is lower than a threshold. In some examples, the threshold may be predetermined. In other examples, the threshold may be dynamic and based on factors other than the ambient light level, such as whether a flash is in auto mode or on, sensor signals, etc. For example, one or more processors 110 may compare the determined ambient light level to threshold 107. Based on the ambient light level being lower than the predetermined threshold, one or more processors 110 may control the display to display first UI 105 in a first mode. When one or more processors 110 control the display to display first UI 105, the pixels in region 120 over an under-display camera sensor (e.g., camera sensor 112) are set to black (e.g., the pixel values are set to 0). In this manner, when the ambient light is low, image capture device 102 may improve the transmittance in region 120.

In some examples, one or more processors 110 may determine a second ambient light level. One or more processors 110 may determine whether the second ambient light level is lower than a threshold. Based on the second ambient light level not being lower than the threshold, one or more processors 110 may control the display to display second UI 108 in a second mode. When one or more processors 110 control the display to display second UI 108, the pixels in region 120 over an under-display camera sensor (e.g., camera sensor 112) may be non-black (e.g., the pixel values are not set to 0). In this manner, when ambient light is not low, region 120 may display content, such as an image, a portion of an image, an icon, a portion of an icon, or other content, thereby providing a more pleasing appearance than first UI 105.

In some examples, a user may select the mode of the UI. For example, when image capture application 104 is launched, an icon may be displayed which may toggle through different modes of the UI or a separate icon for each mode may be displayed. When the user taps the icon, touch sensor 109 may send a signal to one or more processors 110 and based at least in part on that signal, one or more processors 110 may determine the mode of the UI.

In some examples, one or more processors may perform a scene analysis on the image being captured by camera sensor 112 and may select a UI mode based on the scene analysis. For example, if the face of a subject of the image is well lit, but the background is dark, one or more processors may select the second mode, rather than the first. In some examples, the one or more processors 110 may determine the UI mode may be based at least in part on whether a flash is in auto mode, set to on, or set to off. For example, if the flash is off one or more processors 110 may determine the UI mode to be the first mode. If the flash is on or set to auto, one or more processors 110 may determine the UI mode to be the second mode. In some examples, one or more processors may determine the UI mode further based on other sensor signals, such as a camera sensor signal, a depth sensor signal, etc.

In some examples, there may be a third UI 111. Third UI 111 may have a larger number of black pixels over camera sensor 112 than second UI 108, but a smaller number of black pixels over camera sensor 112 than first UI 105. In some examples, one or more processors 110 may determine the mode of the UI to be the third UI mode based on the ambient light level being higher than a first threshold, but lower than a second threshold, such as during a cloudy day. In some examples, one or more processors 110 may determine the UI to be the third mode (third UI 111) based at least in part on other sensor signals, such as touch sensor 109, camera sensor 112 or the like.

In some examples, for first UI 105, device 2 may optionally fade in and/or fade out the black pixels in the display region (e.g., region 232B) above the camera sensor (e.g., camera sensor 234) to provide a more aesthetically pleasing visual effect. For example, when displaying the first UI, image capture device 102 may fade in the black pixels in the region over the under-display camera. In other words, image capture device 102 may transition the pixel values of the pixels in region 120 above camera sensor 112 from existing non-zero values to zero values over a period of time. For example, image capture device may transition from existing non-zero pixel values to zero pixel values by reducing the values over the period of time from the existing non-zero pixel values to zero pixel values. In some examples, image capture device 102 may fade out the black pixels in the region over the under-display camera sensor, e.g., when transitioning from displaying the first camera user interface to displaying something else. In other words, image capture device 102 may transition the pixel values from existing zero pixel values to non-zero pixel values over a period of time. For example, image capture device may transition from existing zero pixel values to non-zero pixel values by increasing the values over the period of time from the existing zero pixel values to non-zero pixel values. For example, image capture device 102 may fade out the black pixels based on the image capture application closing. In some examples, image capture device 102 may fade out the black pixels based on a new ambient light level sensed by ambient light sensor 122 not being lower than the predetermined threshold.

FIGS. 8A-8C are conceptual diagram illustrating different example UI modes in a region of a display over an under-display camera sensor in accordance with the techniques of this disclosure. FIG. 8A depicts an example of the first mode (first UI 105). Image capture device 502 displays a scene captured by image capture device 502. Image capture device 502 also displays shutter control 506. A camera sensor is shown in dotted white lines underneath the display of image capture device 502. Region 504 is displaying a first number of black pixels above the camera sensor. In some examples, all the pixels in region 504 are black in the first mode. In this manner, image capture device 502 may improve the transmittance of region 504 over the camera sensor. For example, image capture device 502 may display black pixels above the camera sensors in low ambient light situations. While region 504 is shown as square, region 504 may be of any shape.

FIG. 8B depicts an example of the second mode. For example, image capture device 512 displays a scene captured by image capture device 512. Image capture device 512 also displays shutter control 516. A camera sensor is shown in dotted lines underneath the display of image capture device 512. Region 514 may display a second number of black pixels above the camera sensor. In some examples, the second number is smaller than the first number used in the first mode. In some examples, the second number is zero. In this manner, image capture device 502 may display image content in region 514 over the camera sensor. For example, image capture device 502 may not display black pixels above the camera sensors in high ambient light situations. While region 514 is shown as square, region 504 may be of any shape.

FIG. 8C depicts an example of a third mode. For example, image capture device 522 displays a scene captured by image capture device 522. Image capture device 522 also displays shutter control 526. A camera sensor is shown in dotted lines underneath the display of image capture device 522. Region 524 is displaying a third number of black pixels above the camera sensor. The number of black pixels may be greater than the second number used in the second mode and less than the third number used in the third mode. In this manner, image capture device 522 may display some image content in region 524 over the camera sensor. This third mode may be used in situations where the ambient light is less than the first predetermined threshold but less than a second predetermined threshold. For example, image capture device 502 may display some black pixels above the camera sensors in medium ambient light situations.

Figure 9C:
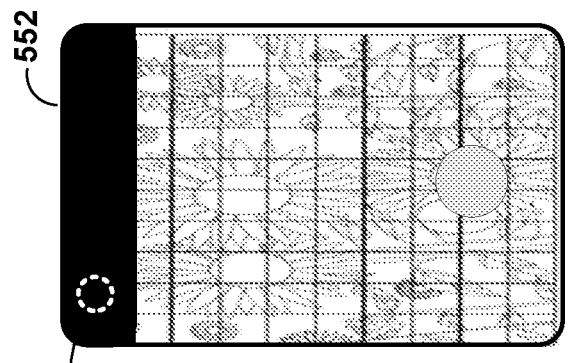
FIGS. 9A-9C are conceptual diagrams illustrating further examples of the first mode in accordance with the techniques of this disclosure.
Figure 9B:
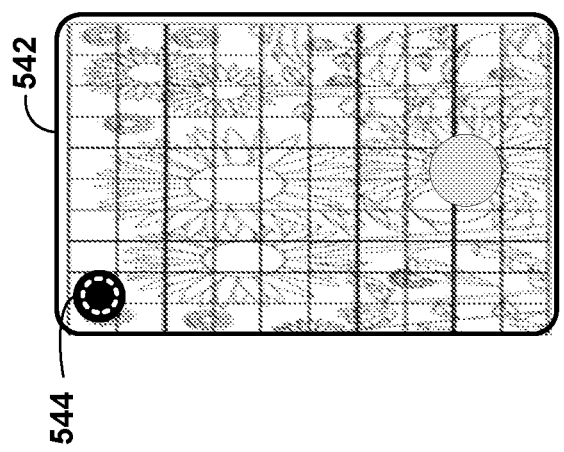
Figure 9A:
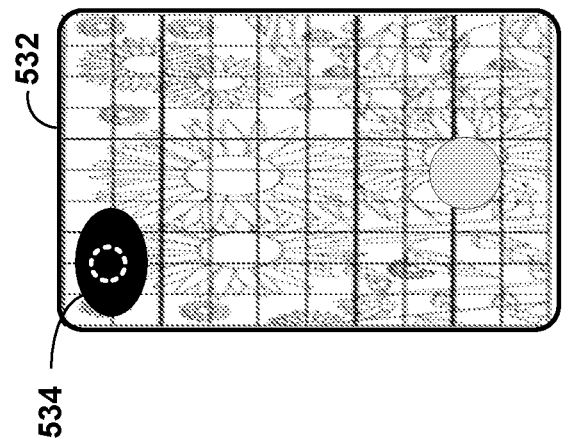

FIGS. 9A-9C are conceptual diagrams illustrating further examples of the first mode in accordance with the techniques of this disclosure. In FIG. 9A, image capture device 532 is depicted with an oval region 534 displaying black pixels over the camera sensor (shown with white dashed lines). In FIG. 9B, image capture device 542 is depicted displaying a circular region over the camera sensor (shown with white dashed lines). In FIG. 9C, image capture device 552 is depicted displaying a generally rectangular region over the camera sensor (shown with white dashed lines). These are just a few shapes of a region above the camera sensor that may display black pixels above the camera sensor when the image capture device is in the first mode. As discussed above, the region displaying black pixels in the first mode may be of any shape.

Figure 10:
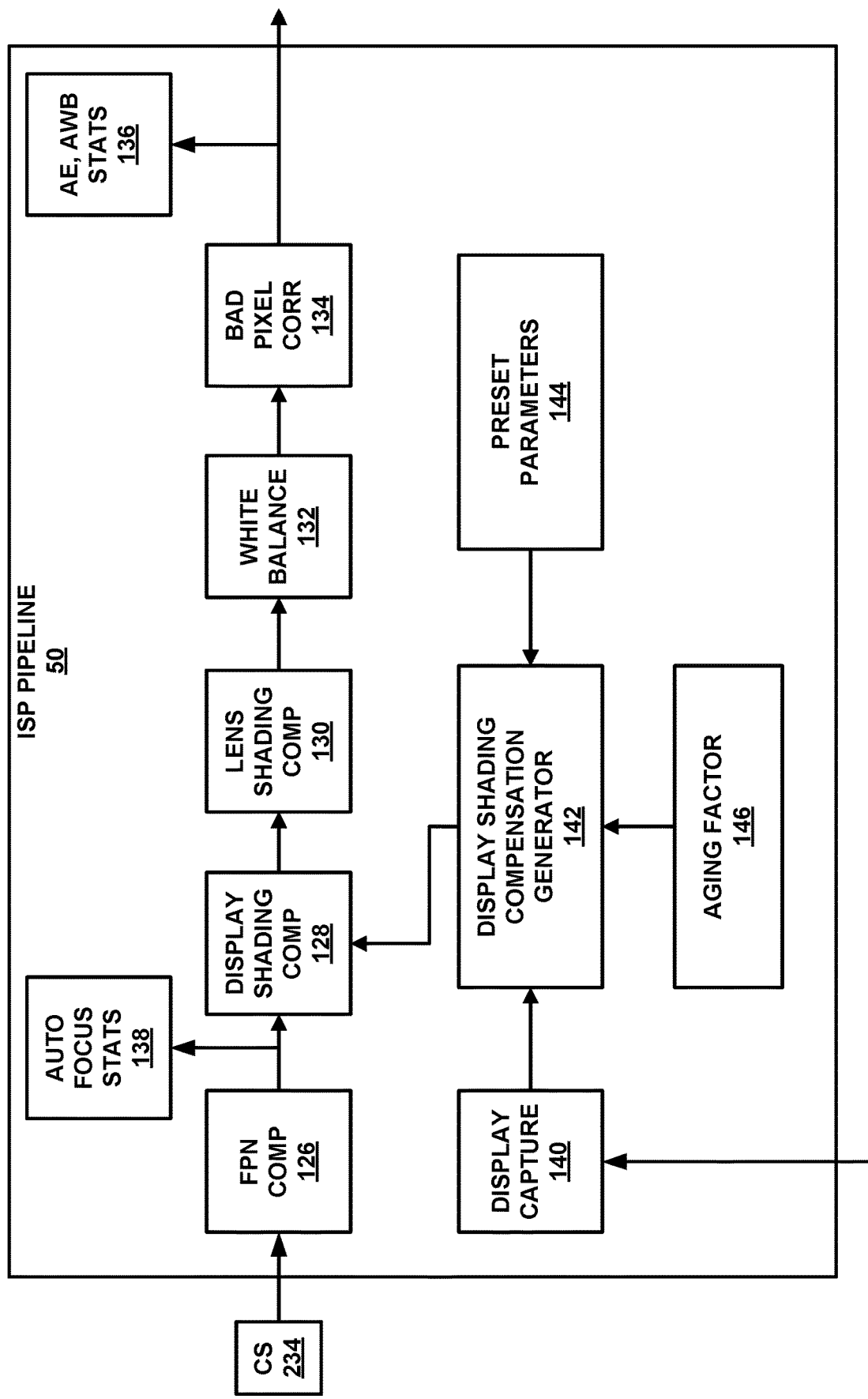
FIG. 10 is a block diagram showing an example image signal processing (ISP) pipeline in accordance with techniques of this disclosure.

FIG. 10 is a block diagram illustrating an image signal processing (ISP) pipeline 50 according to the techniques of the present disclosure. ISP pipeline 50 may be contained within image signal processor 6 and may be implemented as discussed above with respect to FIG. 1. ISP pipeline 50 may be contained within image capture device 230 of FIG. 2D. While the operations of ISP pipeline 50 are shown in a particular order, the particular order is exemplary and the order of the operations may be changed according to the techniques of the present disclosure.

FPN compensator (FPN comp) 126 may receive data from a camera sensor 234. In some examples, at least a portion of a sub-pixel is disposed over camera sensor 234. In other examples, sub-pixels of the display are disposed above and adjacent to camera sensor 234 with no occlusion of the camera sensor by the sub-pixels of the display. For example, a small camera sensor may be disposed under the display between sub-pixels. FPN compensator 126 may compensate for fixed pattern noise, for example dark or black pattern noise. The output of FPN compensator 126 may be provided to auto focus statistics unit 138 which may determine statistics regarding operations of auto focus which may be used, for example, to improve the auto focus function for a subsequently captured image. The output of FPN compensator 126 may also be provided to display shading compensator 128.

Display capturer 140 may capture content displayed on display 232, for example. In some examples, display capturer 140 may capture at least a portion of display content. In some examples, display capturer 140 may capture a portion of display content displayed in region 232B of display 232. In some examples, display capturer 140 may capture a portion of content displayed in a region located at least partially over camera sensor 234. In some examples, display capturer 140 may capture a portion of content displayed in a region located directly over camera sensor 234. In other examples, display capturer 140 may capture all the content displayed on display 232. Display capturer 140 may be implemented as a cache buffer that captures display content in run time. In some examples, display capturer 140 may be located outside of ISP pipeline 50. In some examples, display capturer 140 may be implemented in local memory 8, in external memory 14, in a display processing pipeline, or elsewhere within device 2.

ISP pipeline 50 may access a stored group of preset parameters 144. In some examples, preset parameters 144 may be stored within local memory 8 of image processing apparatus 4. In other examples, preset parameters 144 may be stored elsewhere, such as in external memory 14. Preset parameters may represent compensation parameters used to compensate for issues such as shading or color tinting caused by a display sub-pixel layout (such as described with respect to FIGS. 6A-6C). In some examples, the preset parameters may comprise a plurality of stored adjustment matrices. As information regarding the size, shape and location of sub-pixels in a given manufacturer's display is known by the manufacturer and may be readily available from the manufacturer, this information may be used to determine initial values for the preset parameters. In some examples, the preset parameters may also include zoning control information, such as which particular pixels may be active in an area such as region 232B when camera sensor 234 is actively capturing an image(s) such as discussed above with respect to FIG. 5. In some examples, preset parameters may then be fine-tuned in a laboratory or factory using a sample camera sensor and sample display with different display contents before being input to the image capture device. In other examples, preset parameters may be updated over the air to the image capture device based on fine-tuning in a laboratory.

Figure 11A:
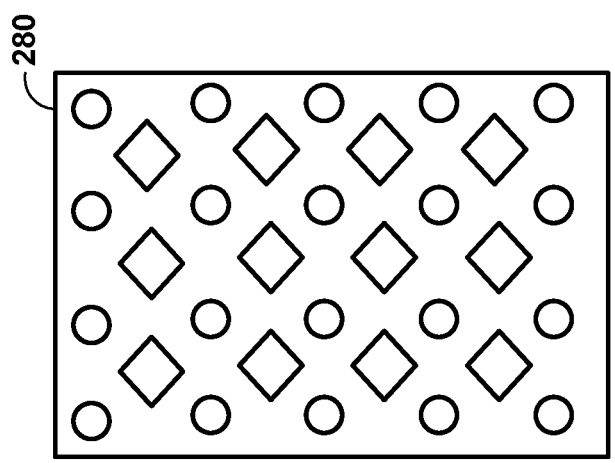
FIGS. 11A-11C are conceptual diagrams representing determining of preset parameters according to the techniques of this disclosure.
Figure 11B:
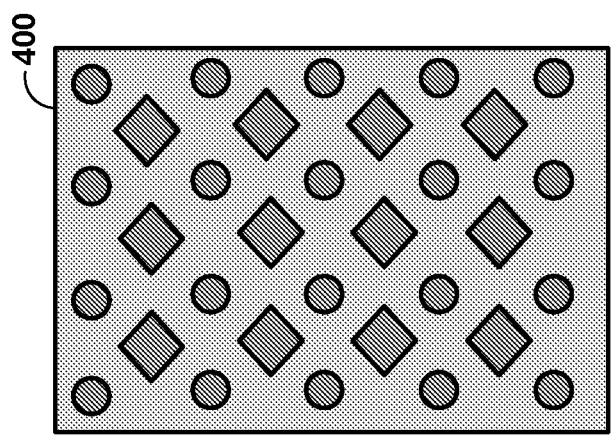
Figure 11C:

FIGS. 11A-11C are conceptual diagrams representing the determination of preset parameters. FIG. 11A represents the layout of sub-pixels in a display such as layout 280 in FIG. 6C. One may determine the preset parameters by placing a gray color checker card in a camera tuning box and capture the image of the gray color checker card with the camera sensor that is under the display. In some examples, this image may be captured without any image being displayed on the display. In other examples, this image may be captured repeatedly with different gray scale level images being displayed on the display. Because the camera sensor is located under the display, the sub-pixels of FIG. 11A may obstruct portions of the image being captured. When the image of the gray color checker card is captured, it may look more like image 400 of FIG. 11B than a solid gray image. Preset parameters may be selected such that after an adjustment matrix comprising the preset parameters is applied, the output image of the display shading compensator 128 may resemble a solid gray image, e.g. image 402, such as is shown in FIG. 11C.

For example, an engineer or technician may find the maximum pixel value in the captured image. They may then divide the maximum value by each pixel to determine the gain to be applied to each pixel. One may generate the adjustment matrix, such as a two-dimensional gain matrix, so that the output of each pixel is equal to that of each other pixel after the gains are applied so as to generate the solid gray image of FIG. 11C as an output of the application of the adjustment matrix. The preset parameters may be fine-tuned, for example, by capturing an image with the camera sensor while displaying different content with different colors and brightness levels on the display. The preset parameters may then be adjusted such that the captured image after application of the adjustment matrix closely resembles the image itself. In some examples, the preset parameters may include at least one adjustment matrix.

In some examples, the engineer or technician may use a display content of a 17th-step gray level test pattern (or other gray level test pattern) and different brightness levels to determine the adjustment matrices for the preset parameters. The adjustment matrices may have a size of m by n, which may be determined from capturing a 18% gray level test pattern (or other gray level test pattern). As shown in FIGS. 11A and 11B, the sub-pixels may have repeating shapes. The m by n rectangular shape may be determined in a lab pre-module tuning. For example, if the repeating shapes may all be captured in a 2 pixel by 2 pixel block, then the adjustment matrices may be 2 pixels by 2 pixels. In some examples, the m by n shape may match the shape and size of the camera sensor. In other examples, the m by n shape may not match the shape and size of the camera sensor.

In the m by n region, display shading compensator 128 may apply different gains per sub-pixel pattern (e.g., R sub-pixels, G sub-pixels and B sub-pixels). In other words, in some examples, each color channel has its own group of adjustment matrices.

After the gains are applied, all the sub-pixels may be equal, such as is shown in FIG. 11C. The m by n size adjustment matrices for each display gray level and for each color channel may be stored separately in, e.g., preset parameters 144. For example, 17 or 33 or another number different gray levels (0-N) may be stored. The process may be repeated for different brightness levels and to determine different adjustment matrices, such as two-dimensional gain matrices. These different adjustment matrices may be stored in preset parameters 144, such as shown in Table 1 below. While specific brightness levels are shown in Table 1, any brightness levels may be used according to the techniques of this disclosure.

TABLE 1

| Brightness 0% | Brightness 10% | Brightness 15% | Brightness 20% | Brightness 50% | Brightness 100% |
| --- | --- | --- | --- | --- | --- |
| Gray 0 | 2D matrixA | 2D matrixD | 2D matrixG | 2D matrixJ | 2D matrixM |
| Gray 1 | 2D matrixB | 2D matrixE | 2D matrixH | 2D matrixK | 2D matrixN |
| Gray N | 2D matrixC | 2D matrixF | 2D matrixI | 2D matrixL | 2D matrixO |

In some examples, display shading compensator 128 may repeat the m by n adjustment matrix to adjust the whole camera sensor image. For example, the whole camera sensor image may be divided into p by q groups. For example, if the camera sensor is 5000 micrometers by 5000 micrometers, and the adjustment matrix is 500 micrometers by 500 micrometers, there are 10 by 10 groups in the whole camera sensor image. In some examples, display shading compensator 128 may apply the same adjustment matrix may to the 10 by 10 groups. In other examples, the adjustment matrix may be applied only for the region of the display directly above camera sensor 234. In further examples, the adjustment matrix may be applied for the region 232B. In some examples, different adjustment matrices may be applied in different regions. For example, different adjustment matrices may be applied for region 232A, 232B and 232C or for areas of the display above image sensor(s) and not above an image sensor. In some examples, such as is shown in Table 2, matrix1 may be applied for areas not above a camera sensor, matrix2 may be applied to the area above camera sensor 234 and matrix 3 may be applied to the area above camera sensor 238.

TABLE 2

| matrix1 | matrix1 | matrix1 |
| matrix1 | matrix2 | matrix1 |
| matrix1 | matrix1 | matrix3 |

In some examples, if the difference between different adjustment matrices is less than a predetermined threshold, not all of the adjustment matrices may be stored. In some examples, the difference may be a cumulative difference of all the elements of the adjustment matrices. In some examples, the difference may be an average difference of all the elements of the adjustment matrixes. In some examples, the predetermined threshold may be on the order of 0.0001. For example, if the difference between two adjustment matrices is less than the predetermined threshold, instead of storing both adjustment matrices, one adjustment matrix may be stored and used in both cases. For example, if the difference between 2D matrixD in Table 1 and 2D matrixA is less than a predetermined threshold, one of the two matrices may be stored and used for situations where the brightness is 10% or 15%. In some examples, if a specific adjustment matrix is greater than three times the threshold of the difference from another adjustment matrix, that adjustment matrix may be stored directly. For example, if the difference between 2D matrixD and 2D matrixA is more than three times the threshold, 2D matrixD may be stored in preset parameters 144. In some examples, only adjustment matrices with a relatively large difference (e.g., 3 time the threshold) from other adjustment matrices may be saved in preset parameters 144.

Referring back to FIG. 10, display shading compensation generator 142 may compute a regional display average of the sub-pixel values (e.g., RGB) in the region. In some examples, the region is the area of the display directly above camera sensor 234. In other examples, the region is region 232B. In still other examples, the region is the entire display. For example, display shading compensation generator 142 may add together the values of the sub-pixels (e.g., each between 0 (black) and 255 (white)) in the region and divide by the number of pixels times the number of sub-pixels per pixel. The average may provide an indication of the brightness of the image being displayed. Display shading compensation generator 142 may use the average as an index to select or adjust a given adjustment matrix based on the preset parameters. For example, if the average of the sub-pixel values is low, display shading compensation generator 142 may select one of 2D matrixA, 2D matrixB, or 2D matrixC. If the average of the sub-pixel values is high, display shading compensation generator 142 may select one of 2D matrixM, 2D matrixN or 2D matrixO. If the average of the sub-pixel values is medium, display shading compensation generator 142 may select one of 2D matrixJ, 2D matrixK, or 2D matrixL. In some examples, display shading compensation generator 142 may select one of the matrices indicated by the index (such as 2D matrixA, 2D matrixB, or 2D matrixC, in the case where the average of the sub-pixel values is a brightness of 10%), by selecting the gray level that is closest to the average gray level or brightness of the sub-pixels, e.g., 10%. In other examples, display shading compensation generator may use other methods to select an adjustment matrix from the group indicated by the index.

In the example of Table 1, if the average of the sub-pixel values does not match with any of the table entries, display shading compensation generator 142 may utilize one or more of the table entries and adjust the matrix up or down accordingly. For example, if the average of the sub-pixel values indicates that the brightness is on the order of 40%, display shading compensation generator 142 may select two adjustment matrices of the same indexed gray level (e.g., 2D matrixK and 2D matrix) and interpolate between them. In other examples, display shading compensation generator may select one adjustment matrix and adjust the matrix accordingly, for example, increasing or decreasing gains.

An example 3×3 adjustment matrix may for four color channels (e.g., RGBG) may be [(1.01358, 1.02586, 1.13256, 1.7465), (1.01358, 1.02486, 1.13256, 1.7265), (1.01358, 1.02586, 1.13256, 1.7463), (1.01358, 1.02586, 1.13256, 1.2465), (1.01358, 1.02586, 1.13256, 1.7449), (1.01358, 1.02586, 1.13256, 1.7464), (1.01358, 1.02586, 1.13256, 1.2465), (1.01358, 1.02586, 1.13256, 1.2468), (1.01358, 1.02586, 1.13256, 1.7462),]. This example matrix may be applied to image data by display shading compensator 128 to compensate for display shading.

In some examples, display shading compensation generator 142 may select from a memory, such as local memory 8 or external memory 14, an adjustment matrix, such as a two-dimensional gain matrix, from adjustment matrices which may be stored in preset parameters 144 to be applied to the output of FPN compensator 126 based on at least a portion of content captured in display capturer 140 (e.g., at least a portion of content displayed) and preset parameters 144. In other examples, display shading compensation generator 142 may generate an adjustment matrix, such as a two-dimensional gain matrix, based on at least a portion of content captured in display capturer 140 and preset parameters 144. For example, display shading compensation generator 142 may determine the adjustment matrix by calculating average values for R, G, and B (or R, G, B and W) of the displayed content in display capturer 140. Display shading compensation generator 142 may then use the average values as an index to determine which adjustment matrix based on the preset parameters to use or which adjustments to make to an adjustment matrix. In some examples, display shading compensation generator 142 determines an adjustment matrix for each color component (e.g., R, G, and B). Display shading compensation generator 142 may then provide the two-dimensional gain matrix to display shading compensator (display shading comp) 128.

As mentioned above, subpixels in a display age over time. This subpixel aging over time may include the subpixel's cathode and anode materials aging caused by the display content pixels' driving current. Subpixel aging may decrease the transmittance of the subpixel over time. For an under-display camera, display shading may have a strong aging component. In other words, display shading may become worse as time progresses due to aging of subpixels in the display. Along with time and usage, display shading may become more pervasive as the display becomes less transparent. This subpixel aging may affect entire ISP pipeline 50, including the auto exposure control, auto focus and auto white balance.

In some examples, according to the techniques of this disclosure, a transmittance aging model may be used along with the display content and/or the predetermined parameters to generate or select an adjustment matrix. For example, the adjustment matrix may be further based on an aging factor 146. For example, aging factor 146 may be used by display shading compensation generator 142 to generate the adjustment matrix. In some examples, display shading compensation generator 142 may multiply a selected or generated adjustment matrix by aging factor 146. ISP pipeline 50 may determine this aging factor based on statistics related to display pixel values and time in a region of display 232, e.g., the region over camera sensor 234 or camera sensor 238, such as region 232B or region 232C, respectively. For example, ISP pipeline 50 may monitor an amount of time each subpixel in the region is on and the display pixel values of each subpixel in the region during the time the subpixel is on and use the monitored time and display pixel values to determine the aging factor. In some examples, the aging factor may be determined based on measurements in aging experiments in a laboratory environment. Such experiments may measure display pixel values and time with respect to an area of display 232, such as region 232B or region 232C. In some examples, ISP pipeline 50 may generate a coefficient curve of the aging factor or the coefficient curve of the aging factor may be generated by another device, such as a computing device in the laboratory. In some examples, the aging factor may be determined through examining statistics in a color space or light spectrum.

In some examples, ISP pipeline 50 may determine the aging factor as a statistical measure of a transmittance decay comparison of the pixels in an area of the display, such as region 232B or region 232C, such as an average of a transmittance decay ratio. As used herein, a ratio is a species of the genus of comparison. For example, for (each pixel in this region, which is defined by shape mask)

```
{
    pixel value diff=n(R,G,B) – n-1(R,G,B);
    If (pixel diff > threshold){
        start record new pixel value time;
        finish previous pixel value record time;
        accumulate previous pixel transmittance decay ratio;
    }
    region average transmittance decay ratio = average ( m X n ) pixel transmittance decay ratio;
}
```

In some examples, rather than modifying the 2D matrix by multiplying the 2D matrix by an aging factor, the aging factor may be used to modify other algorithms in ISP pipeline 50 or image signal processor 6. For example, the aging factor may be used to modify the AEC process 20, AF process 24, and/or AWB process 22 (each of FIG. 1). In some examples, the aging factor may be used with color adaption.

Display shading compensator 128 may then apply the two-dimensional gain matrix to the output of FPN compensator 126. In some examples, display shading compensator 128 may apply the two-dimensional gain matrix in a piecewise bi-linear manner to the output of FPN compensator 126. Display shading compensator 128 may have multiple programmable sections and may apply gains in each dimension (e.g., x-direction and y-direction). Display shading compensator 128 may perform compensation to the output of FPN compensator 126 separately for each color channel. For instance, display shading compensator 128 may apply different gains (e.g., through a separate two-dimensional gain matrix) for red than for blue and for green.

The output of display shading compensator 128 may be provided to lens shading compensator 130 which may compensate for shading caused by a camera lens. In some examples, display shading compensator 128 may be combined with lens shading compensator (LENS SHADING COMP) 130. Lens shading compensator 130 may provide a lens shading compensated output to auto white balance unit (WHITE BALANCE) 132 which may perform an auto white balance process to the lens shading compensated signal. Auto white balance unit 132 may provide an auto white balanced signal to bad pixel corrector (BAD PIXEL CORR) 134. Bad pixel corrector 134 may correct bad pixels and output an image processed signal. For example, bad pixel corrector 134 may determine a pixel in an image is an outlier and attempt to replace the pixel value with a value more similar to the values of neighboring pixels. Auto exposure and auto white balance statistics unit (AE, AWB STATS) 136 may receive the image signal processed signal and use information therein to adjust auto exposure and/or auto white balancing of the image capture device, for example image capture device 230, for subsequently captured images. The image signal processed signal may be provided to a display processor for display on, for example, display 232, and/or stored in memory, such as local memory 8 or external memory 14 as a video file or snapshot.

In some examples, content may be displayed on display 232 at the same time that camera sensor 234 may be capturing an image(s). In some examples, the content being displayed on display 232 may be displayed at a frame rate that differs from the shutter speed of camera sensor 234. As discussed above, display shading compensation generator 142 may select or generate an adjustment matrix, such as a two dimensional gain matrix, to apply to the output of FPN compensator 126. In order to keep the application of the appropriate adjustment matrix in synchronization with the image(s) captured by camera sensor 234, further techniques of this disclosure may be applied.

In some examples, display capturer 140 may include ring buffer (RB) 148 to provide the appropriate temporal display content pixels (which may be at least a portion of one or more frames) to display shading compensation generator at the appropriate time. Ring buffer 148 may be implemented in local memory 8, in external memory 14, in a display processor or elsewhere in device 2.

Figure 12:
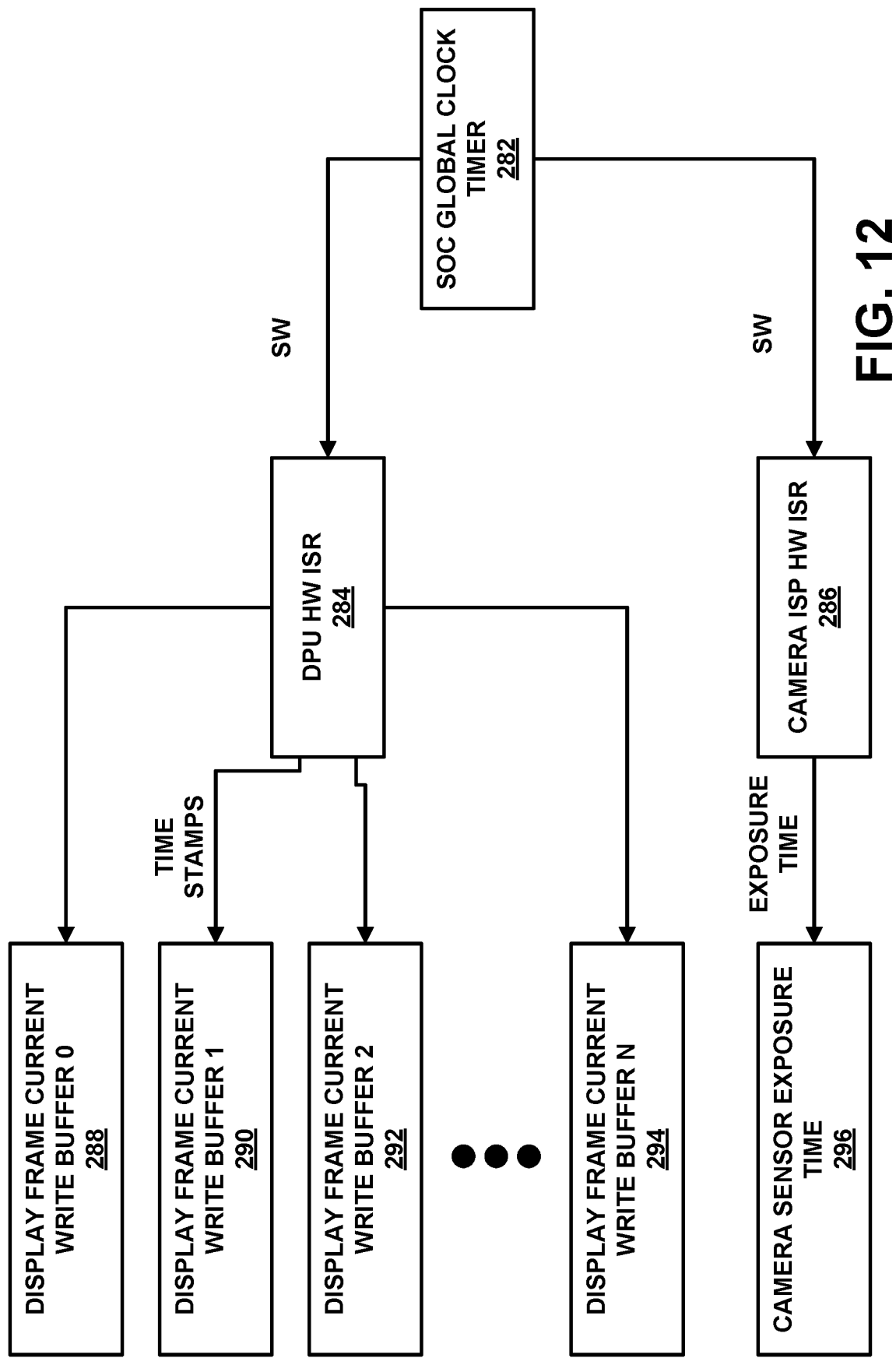
FIG. 12 is a conceptual diagram illustrating techniques for synchronizing display shading compensation.

FIG. 12 is a conceptual diagram illustrating techniques for synchronizing display shading compensation. In the example of FIG. 12, every display frame content dumped into the ring buffer may be marked with a time stamp. For example, display capturer 140 may capture a portion of one or more frames of display content in any number of display frame current write buffers (e.g., display frame current write buffer 0 288A, display frame current write buffer 1 288B, display frame current write buffer 2 288C through display frame current write buffer N (where N may be any positive integer) 288N, which may be implemented as ring buffer 148 and which may be referred to as display frame current write buffers 288).

A data processing unit hardware interrupt service request (DPU HW ISR) 284 using a global clock source 282 for device 2, such as a system on a chip (SOC) global clock source, may apply a timestamp to each of the portions of one or more frames of display content. As mentioned above, as used herein, a portion of a frame means either a portion of a frame or an entire frame. This timestamp may be indicative of a time the frame was displaying on display 232. During camera sensor exposure periods (e.g., when capturing an image), the start time and end time of the exposure may be using global clock source 282. For example, global clock source 282 may provide the time to DPU HW ISR 284 and camera image signal processing hardware interrupt service request (ISP HW ISR) 286. DPU HW ISR 284 may apply a time stamp to each of the portions of the one or more frames of display content stored in the display frame current write buffers 288. ISP HW ISR 286 may determine the camera sensor exposure time 296 (e.g., the start time and end time of the exposure).

Display shading compensation generator 142 may fetch the appropriate portion(s) of one or more frames of display content from any of display frame current write buffers 288 based on the applied time stamps and the camera sensor exposure time 296. For example, display shading compensation generator 142 may fetch at least a portion of frame-n, or at least a portion of frame-p to frame-q, based on their time stamp from display frame current write buffers 288 and camera sensor exposure time 296, as needed. The corresponding display content may be used to select or generate the proper adjustment matrix. In the example where display shading compensation generator 142 generates the adjustment matrix, at least a portion of frame-n may be used to generate matrix-n and (a portion of frame-p, a portion of frame-q) may be used to generate (matrix-p, matrix-q).

Display shading compensation generator 142 may generate the adjustment matrix to be applied by display shading compensator 128 based on these previously mentioned matrices. For example, display shading compensation generator 142 may generate the adjustment matrix to be applied by display shading compensator 128 by calculating a temporal sum of (matrix-p, matrix-q). If the camera exposure time falls completely within one frame period, e.g., frame-n, then display shading compensation generator 142 may generate the adjustment matrix to be applied by display shading compensator 128 by simply using the matrix itself, e.g., matrix-n.

For example, with a 120 Hz display, the display frame time is 8.33 ms. If the camera sensor exposure time is $\frac{1}{30}$ second (33.33 ms), a total of eight (or some other number greater than four to allow for engineering margin and avoid buffer overflow) display frame current write buffers may be used. Display capturer 140 may use four of display frame current write buffers 288 to capture four frames (frames 0, 1, 2, and 3) or portions thereof. Display shading compensation generator 142 may use the four frames or portions thereof to generate 4 matrices (matrices 0, 1, 2, and 3). During each of frames 0, 1, 2, and 3 the camera sensor may be exposed for the entire duration of each of the frames. In this example, display shading compensation generator 142 may calculate the adjustment matrix to be applied by display shading compensator as follows: adjustment matrix=(8.33/33.33*matrix 0)+ (8.33/33.33*matrix 1)+ (8.33/33.33*matrix 2)+ (8.33/33.33*matrix 3). In some examples, the camera sensor may only be exposed for part of one or more frames. Taking the example above and changing the example such that the camera sensor is only exposed for 7.5 microseconds in frame 0, but is exposed during the entirety of frames 1, 2 and 3, display shading compensation generator 142 may calculate the adjustment matrix to be applied by display shading compensator as follows: adjustment matrix= (7.5/33.33*matrix 0)+ (8.33/33.33*matrix 1)+ (8.33/33.33*matrix 2)+ (8.33/33.33*matrix 3).

In another example, with a 60 Hz display, the display frame time is 16.66 ms. If the camera sensor exposure time is 1/125 second (4 ms), a total of two (or some other number greater than one to allow for engineering margin and avoid buffer overflow) display frame current write buffers 288 may be used. Display capturer 140 may use one of display frame current write buffers 288 to capture a frame or a portion thereof in which the camera exposure occurred, e.g., frame 1. In this example, the camera sensor exposure is entirely in frame 1, so display shading compensation generator 142 may generate matrix 1 from frame 1 and then provide matrix 1 to display shading compensator 128 as the adjustment matrix to apply to the output of FPN compensator 126.

Figure 13:
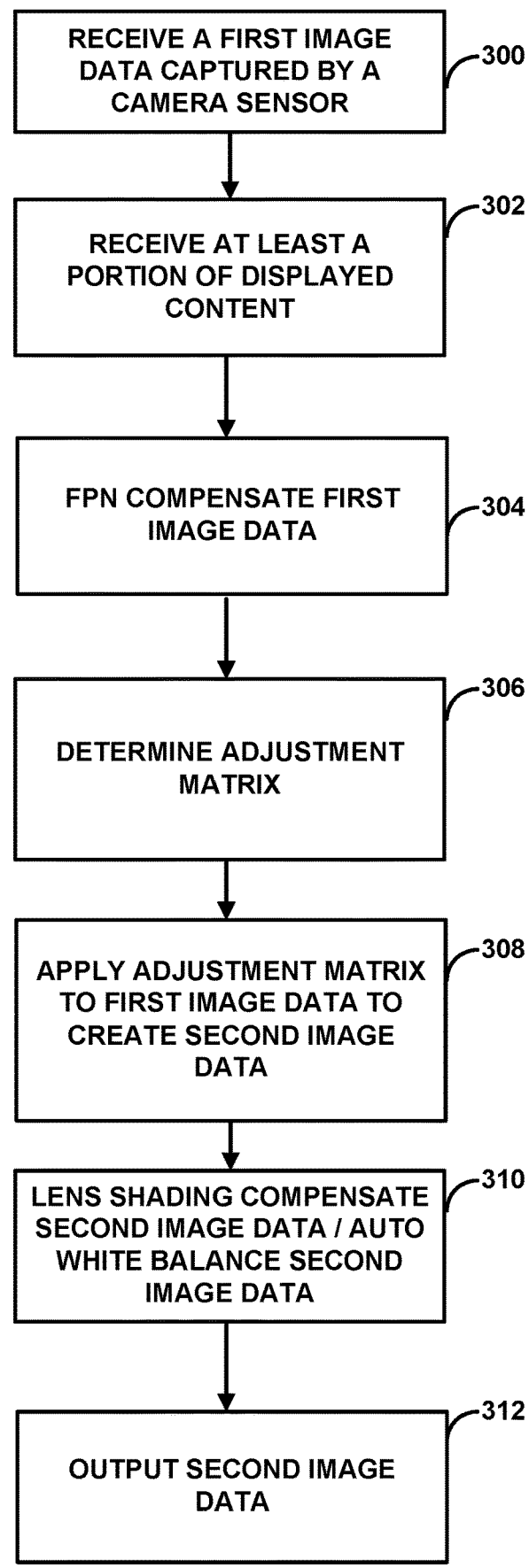
FIG. 13 is a flowchart illustrating example display shade compensation techniques according to this disclosure.

FIG. 13 is a flowchart illustrating example display shading compensation techniques of the present disclosure. ISP pipeline 50 may receive first image data captured by camera sensor 234 (300). For example, the first image data may be representative of a user's face and background surrounding the user's face when the user is taking a "selfie." ISP pipeline 50 may receive at least a portion of displayed content (302). For example, ISP pipeline 50 may receive the portion of displayed content located in region 232B of display 232. In other examples, ISP pipeline 50 may receive the portion of displayed content directly above camera sensor 234. In still other examples, ISP pipeline 50 may receive all of the displayed content.

In some examples, ISP pipeline 50 (e.g., FPN compensator 126) may compensate the first image data for FPN (304). Any known techniques may be utilized to compensate for FPN. ISP pipeline 50 (e.g., display shading compensation generator 142) may determine an adjustment matrix (306), such as a two-dimensional gain matrix. The adjustment matrix may be based on the portion of the displayed content in display capturer 140. In some examples, the adjustment matrix is also based on preset parameters 144. In some examples, the adjustment matrix is also based on an aging factor. In some examples, determining the adjustment matrix may include multiplying a two-dimensional compensation matrix based on the at least a portion of the display content and the preset parameters by the aging factor. The aging factor may be based on the aging state of the pixels above the camera sensor. For example, the aging factor may be based on a statistical measure of a transmittance decay comparison (such as an average of a transmittance decay ratio) of pixels in the region (e.g., region 232B) above the under-display camera sensor (e.g., camera sensor 234).

As discussed above, the preset parameters may be compensation parameters to compensate for effects caused by sub-pixel size, shape and location in display 232 such as those in FIGS. 6A-6C. In some examples, ISP pipeline 50 (e.g., display shading compensation generator 142) may determine the adjustment matrix, such as the two-dimensional gain matrix, by selecting one from adjustment matrices stored in preset parameters 144. In some examples, preset parameters 144 may be in local memory 8 or external memory 14. In other examples, preset parameters 144 may be in ISP pipeline 50. In the case where ISP pipeline 50 selects an adjustment matrix, ISP pipeline 50 may attempt to select the adjustment matrix that may best compensate for display shading. In some examples, ISP pipeline 50 determine an average sum of sub-pixels in a region and use the average as an index to determine which adjustment matrix to select as discussed above. In some examples, ISP pipeline 50 may interpolate between two adjustment matrices or otherwise adjust a given selected adjustment matrix. In other examples, ISP pipeline 50 may calculate an adjustment matrix, such as a two-dimensional gain matrix, based upon the at least a portion of displayed content in display capturer 140. In some examples, ISP pipeline 50 may calculate the adjustment matrix based upon the at least a portion of displayed content in display capturer 140 and preset parameters 144.

ISP pipeline 50 (e.g., display shading compensator 128) may apply the adjustment matrix to the first image data (either after FPN compensation or not) to create second image data (308). For example, the second image data may be display shading compensated so as to reduce or eliminate the effects of shading caused by sub-pixels in display 232 and light scattering caused by display contents.

In some examples, ISP pipeline 50 (e.g., lens shading compensator 130) may compensate the second image data for lens shading (310). In other examples, ISP pipeline 50 (e.g., auto white balance unit 132) may auto white balance the second image data (310). ISP pipeline 50 may output second image data (312). For example, ISP pipeline 50 may output second image data to memory, such as external memory 14, for permanent storage (or storage until deletion by a user). In another example, ISP pipeline 50 may output second image data to display 232, such as to provide the user with a preview image. In yet another example, ISP pipeline 50 may output second image data to a zero-shutter-lag (ZSL) buffer. In still another example, ISP pipeline 50 may output second image data to an external display. While FIG. 13 depicts steps occurring in a particular order, this order is merely exemplary. The depicted order should not be taken as limiting.

Figure 14:
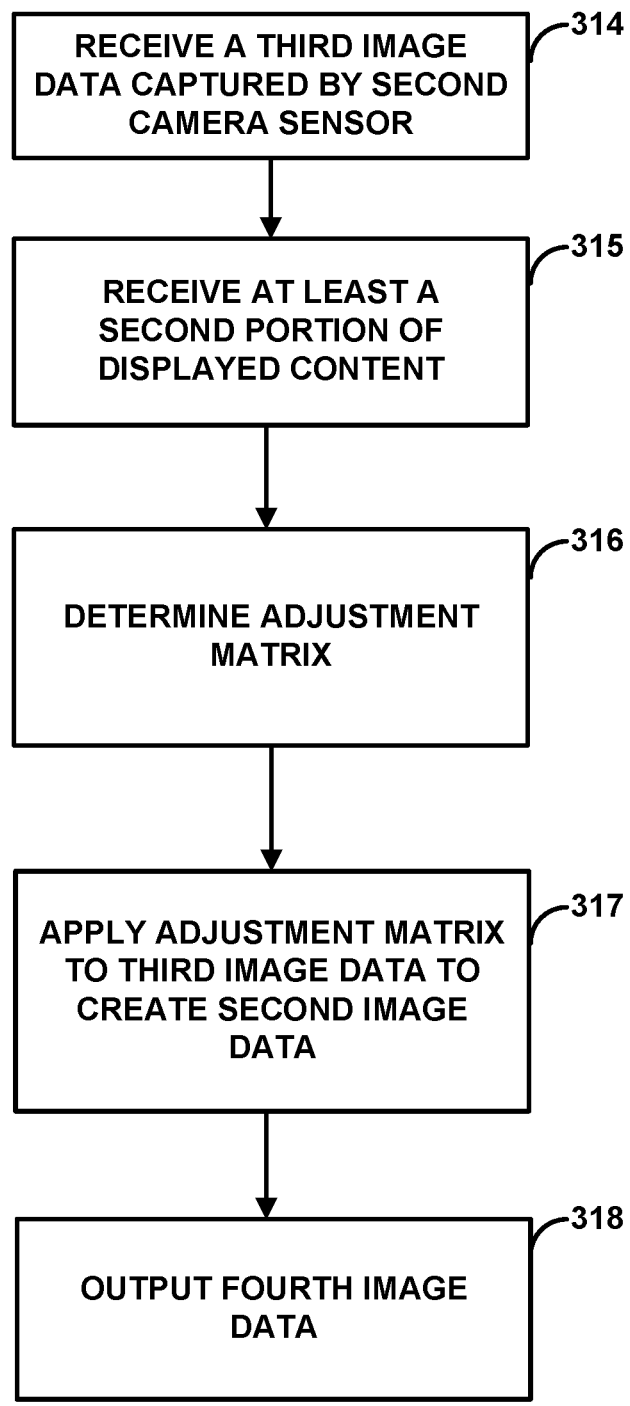
FIG. 14 is a flowchart illustrating example display shade compensation techniques according to this disclosure.

FIG. 14 is a flowchart illustrating example display shading compensation techniques of the present disclosure. The techniques of FIG. 14 may be used with the techniques of FIG. 13. In some examples, an image capture device may have more than one camera sensor below the display. For the purposes of the example of FIG. 14, the camera sensor of FIG. 13 is a first camera sensor, the at least a portion of the display of FIG. 13 is at least a first portion of the display, the at least a portion of display content of FIG. 13 is at least a first portion of display content, and the adjustment matrix of FIG. 13 is a first adjustment matrix.

In the example of FIG. 14, image capture device ISP pipeline 50 may receive third image data captured by second camera sensor 238 (314). For example, the third image data may be different than the first image data, as second camera sensor 238 may be a wider angle or narrower angle sensor than the first camera sensor. ISP pipeline 50 may receive at least a second portion of displayed content (315). For example, ISP pipeline 50 may receive the portion of displayed content located in region 232C of display 232. In other examples, ISP pipeline 50 may receive the portion of displayed content directly above second camera sensor 238. In still other examples, ISP pipeline 50 may receive all of the displayed content. In some examples, the first region and the second region may be the same. In other examples, the first region and the second region may not be the same. In some examples, the first region and the second region may include at least some of the same pixels.

ISP pipeline 50 (e.g., display shading compensation generator 142) may determine a second adjustment matrix (316), such as a two-dimensional gain matrix. The adjustment matrix may be based on the portion of the displayed content in display capturer 140. In some examples, the adjustment matrix is also based on preset parameters 144. In other examples, the adjustment matrix is also based on an aging state of the pixels above the camera sensor. As discussed above, the preset parameters may be compensation parameters to compensate for effects caused by sub-pixel size, shape and location in display 232 such as those in FIGS. 6A-6C. In the example of FIG. 2D, camera sensor 234 and second camera sensor 238 are located in different locations below display 232. As such, different displayed content may be displayed above camera sensor 234 than above second camera sensor 238. Additionally, the sub-pixels (or portions thereof) located above camera sensor 234 may be different than the sub-pixels (or portions thereof) located above camera sensor 238. The aging state of the pixels in region 232B and region 232C may also be different. Therefore, the second adjustment matrix may be different than the adjustment matrix of the example of FIG. 13.

In some examples, ISP pipeline 50 may determine the second adjustment matrix, such as the two-dimensional gain matrix, by selecting one from adjustment matrices which may be stored in preset parameters 144. In some examples, preset parameters may be in local memory 8, external memory 14, or in ISP pipeline 50. In such examples, ISP pipeline 50 may attempt to select the adjustment matrix that may best compensate for display shading. In some examples, ISP pipeline 50 determine an average sum of sub-pixels in the second region and use the average as an index to determine which adjustment matrix to select. In some examples, ISP pipeline 50 may interpolate between two adjustment matrices or otherwise adjust a given selected adjustment matrix. In other examples, ISP pipeline 50 may calculate the second adjustment matrix, such as a two-dimensional gain matrix, based upon the at least a second portion of displayed content in display capturer 140. In some examples, ISP pipeline 50 may calculate the second adjustment matrix based upon the at least a portion of displayed content in display capturer 140 and preset parameters 144.

ISP pipeline 50 (e.g., display shading compensator 128) may apply the second adjustment matrix to the third image data to create fourth image data (317). For example, the fourth image data may be display shading compensated so as to reduce or eliminate the effects of shading caused by sub-pixels in display 232, light scattering caused by display contents, and the aging of the pixels above the camera sensor.

ISP pipeline 50 may output fourth image data (318). For example, ISP pipeline 50 may output fourth image data to memory, such as external memory 14, for permanent storage (or storage until deletion by a user). In another example, ISP pipeline 50 may output fourth image data to display 232 such as to provide the user with a preview image. In yet another example, ISP pipeline 50 may output second image data to a zero-shutter-lag (ZSL) buffer. In still another example, ISP pipeline 50 may output second image data to an external display. While FIG. 14 depicts steps occurring in a particular order, this order is merely exemplary. The depicted order should not be taken as limiting.

Figure 15:
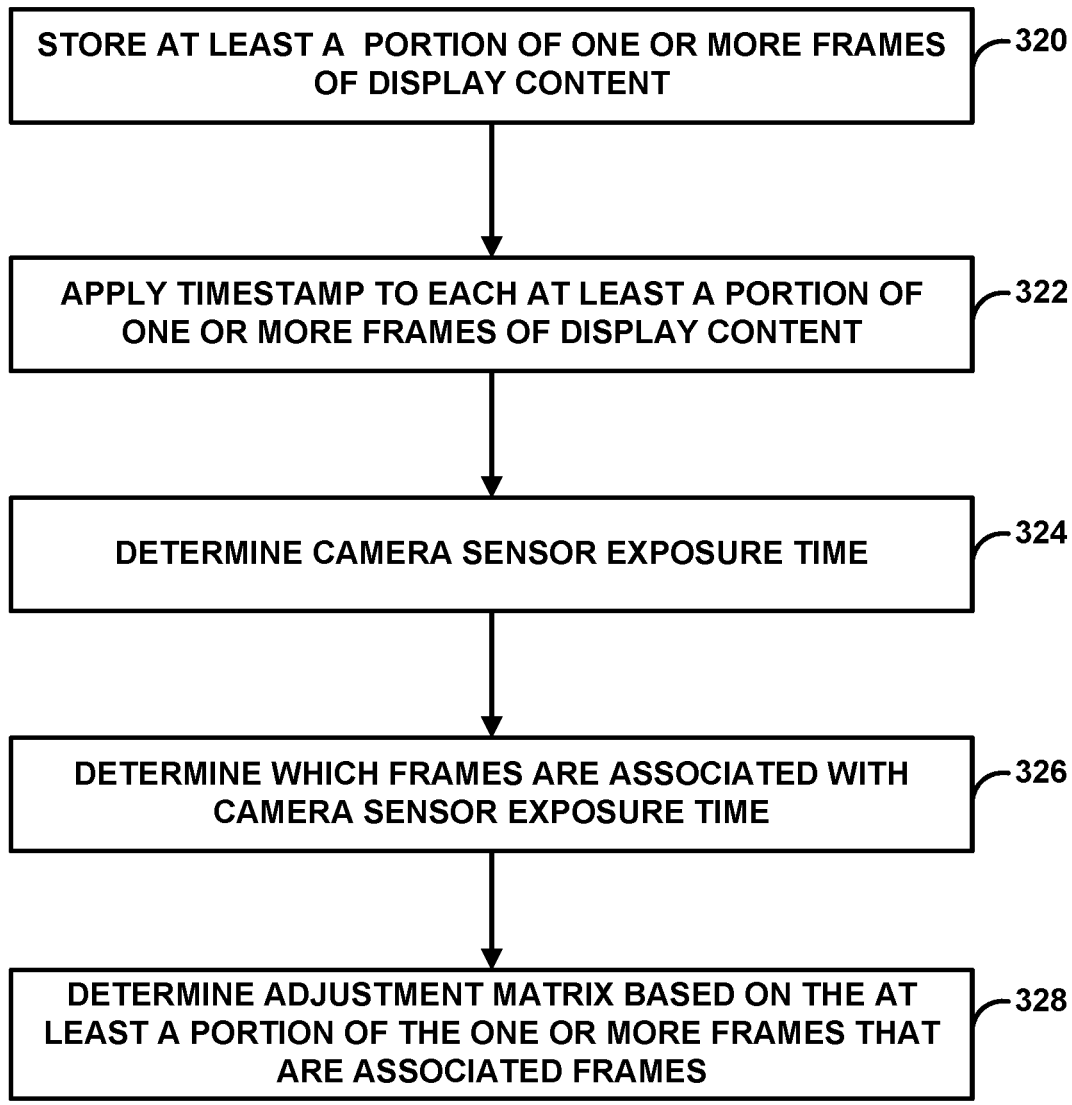
FIG. 15 is a flowchart illustrating example synchronization techniques according to this disclosure.

FIG. 15 is a flowchart illustrating synchronization techniques according to this disclosure. The techniques of FIG. 15 may be used with the techniques of FIGS. 13 and/or 14. For example, ISP pipeline 50 may determine an adjustment matrix (306 of FIG. 13) through the techniques of FIG. 15.

ISP pipeline 50 (e.g., display capturer 140) may store a portion of one or more frames of display content (320) in, e.g., display frame current write buffers 288. DPU HW ISR 284 may apply a timestamp to each portion of one or more frames of display content indicative of a time when the frame was being displayed (322). For example, DPU HW ISR 284 may apply a timestamp that indicates the beginning of the displaying by display 232 of a frame based on global clock source 282. In other examples, DPU HW ISR 284 may apply a timestamp that indicates the end of the displaying by display 232 of a frame based on global clock source 282. In still other examples, DPU HW ISR 284 may apply a timestamp that indicates any other time during the displaying by display 232 of a frame based on global clock source 282.

Camera ISP HW ISR 286 may determine a camera sensor exposure time (324). For example, camera ISP HW ISR may determine a start time of a camera sensor exposure and an end time of the camera sensor exposure based on global clock source 282. ISP pipeline 50 (e.g., display shading compensation generator 142) may determine which frame(s) are associated with the camera sensor exposure time (326). For example, display shading compensation generator 142 may determine which frame(s) are associated with the camera sensor exposure time based on the applied timestamps. For example, display shading compensation generator 142 may compare the camera sensor exposure time to the timestamps. ISP pipeline 50 (e.g., display shading compensation generator 142) may determine an adjustment matrix based on the portions of the one or more frames that are associated frame(s) (328). In some examples, display shading compensation generator 142 may determine an adjustment matrix by selecting one or more best matching adjustment matrix based on the portions of the one or more frames that are associated frame(s). In the case where there is more than one associated frame, display shading compensation generator 142 may select a best matching adjustment matrix for the portions of each associated frame and may perform a calculation, such as a temporal sum, to determine the adjustment matrix to be applied by display shading compensator 128. In some examples, the adjustment matrix may be further based on preset parameters 144.

In other examples, display shading compensation generator 142 may determine the adjustment matrix by generating one or more matrices based the portions of one or more frames that are associated frames. In the case where there is more than one associated frame, display shading compensation generator 142 may generate a matrix for the portion of each associated frame and perform a calculation, such as a temporal sum, to determine the adjustment matrix to be applied by display shading compensator 128. In some examples, the adjustment matrix may be further based on preset parameters 144. While FIG. 15 depicts steps occurring in a particular order, this order is merely exemplary. The depicted order should not be taken as limiting.

Figure 16:
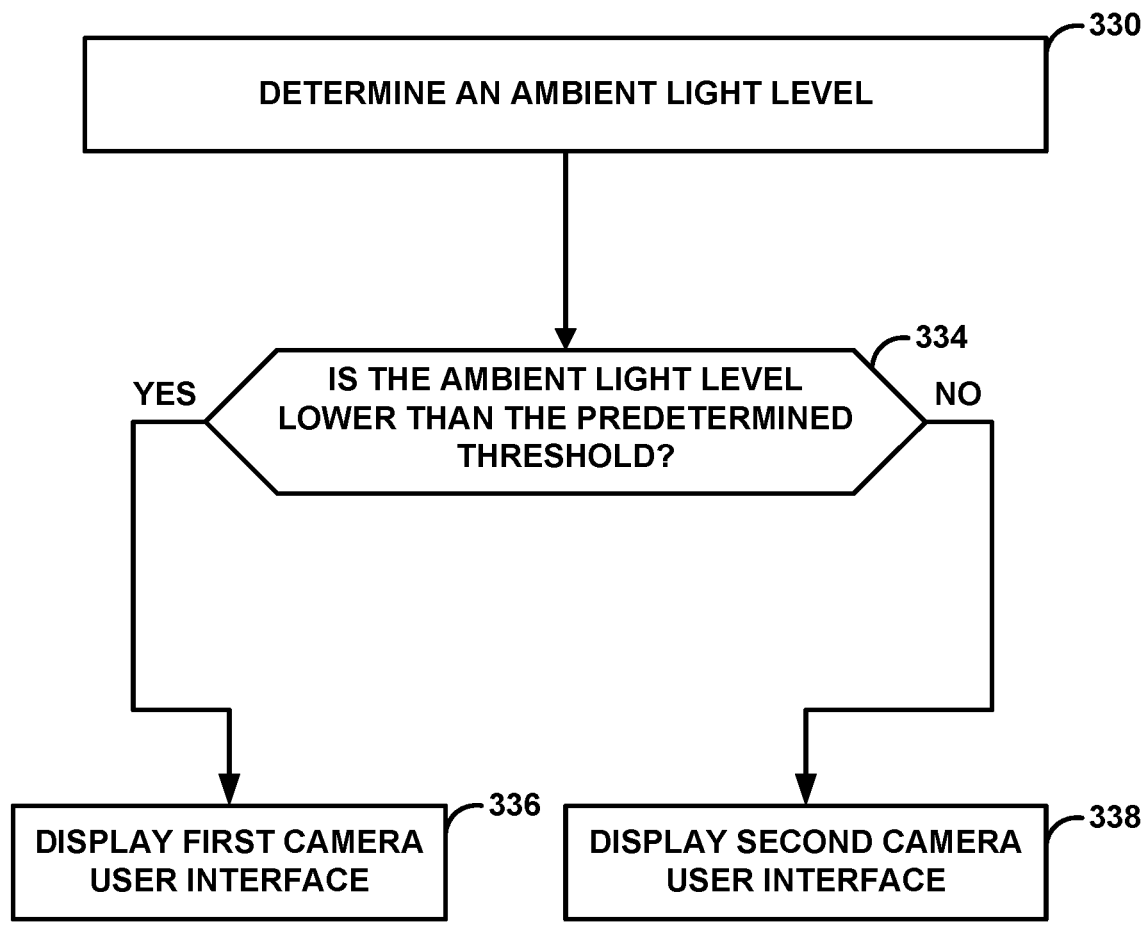
FIG. 16 is a flowchart illustrating an example of determining a user interface according to the techniques of this disclosure.

FIG. 16 is a flowchart illustrating an example of determining a user interface according to the techniques of this disclosure. The techniques of the example of FIG. 16 may be used with the techniques of any of FIGS. 13-15. Image capture device 102 may determine an ambient light level (330). For example, one or more processors 110 may query ambient light sensor 122 to determine the ambient light level and ambient light sensor 122 may sense an ambient light level. Image capture device 102 may determine whether the ambient light level is lower than a predetermined threshold (334). For example, one or more processors 110 of image capture device 102 may compare the determined ambient light level to a predetermined threshold, e.g., threshold 107, stored in memory 114 to determine whether the ambient light level is lower than the predetermined threshold. Based on the ambient light level being lower than the predetermined threshold (the "YES" path in FIG. 16), image capture device 102 may display a first camera user interface (336). For example, image capture device 102 may display on display 116 first UI 105 having black pixels in region 120 over camera sensor 112.

In some examples, the ambient light level may not be lower than the predetermined threshold. In those cases, based on the ambient light level not being lower than the predetermined threshold (the "NO" path in FIG. 16), image capture device 102 may display a second camera user interface (338). For example, image capture device 102 may display on display 116 second UI 108 having non-black pixels in region 120 over camera sensor 112. For example, image capture device 102 may display content, such as an image, a portion of an image, an icon, a portion of an icon, of other content, in region 120 over camera sensor 112.

In some examples, image capture device 102 may launch an image capture application. In some examples, image capture device 102 determines the ambient light level based on launching the image capture application.

In some examples, when displaying first UI 105, image capture device 102 may fade in the black pixels in the region over the under-display camera. In other words, image capture device 102 may transition the pixel values of the pixels in region 120 above camera sensor 112 from existing non-zero values to zero values over a period of time. For example, image capture device may transition from existing non-zero pixel values to zero pixel values by reducing the values over the period of time from the existing non-zero pixel values to zero pixel values. In some examples, image capture device 102 may fade out the black pixels in the region over the under-display camera sensor, e.g., when transitioning from displaying the first camera user interface to displaying something else. In other words, image capture device 102 may transition the pixel values from existing zero pixel values to non-zero pixel values over a period of time. For example, image capture device may transition from existing zero pixel values to non-zero pixel values by increasing the values over the period of time from the existing zero pixel values to non-zero pixel values. For example, image capture device 102 may fade out the black pixels based on the image capture application closing. In some examples, image capture device 102 may fade out the black pixels based on a new ambient light level sensed by ambient light sensor 122 not being lower than the predetermined threshold. While FIG. 15 depicts steps occurring in a particular order, this order is merely exemplary. The depicted order should not be taken as limiting.

Thus, in this manner by providing a first UI for use in low ambient light situations and by providing a display shading compensator, a camera sensor may be located under a display so as to try to maximize display size on an image capture device without otherwise present image quality issues. By locating the camera sensor under the screen, the screen size of the image capture device may be larger than a same sized image capture device using a notched screen and the reliability of image capture device may be improved over the reliability of an image capture device using a pop-up camera with moveable mechanical parts.

Figure 17:
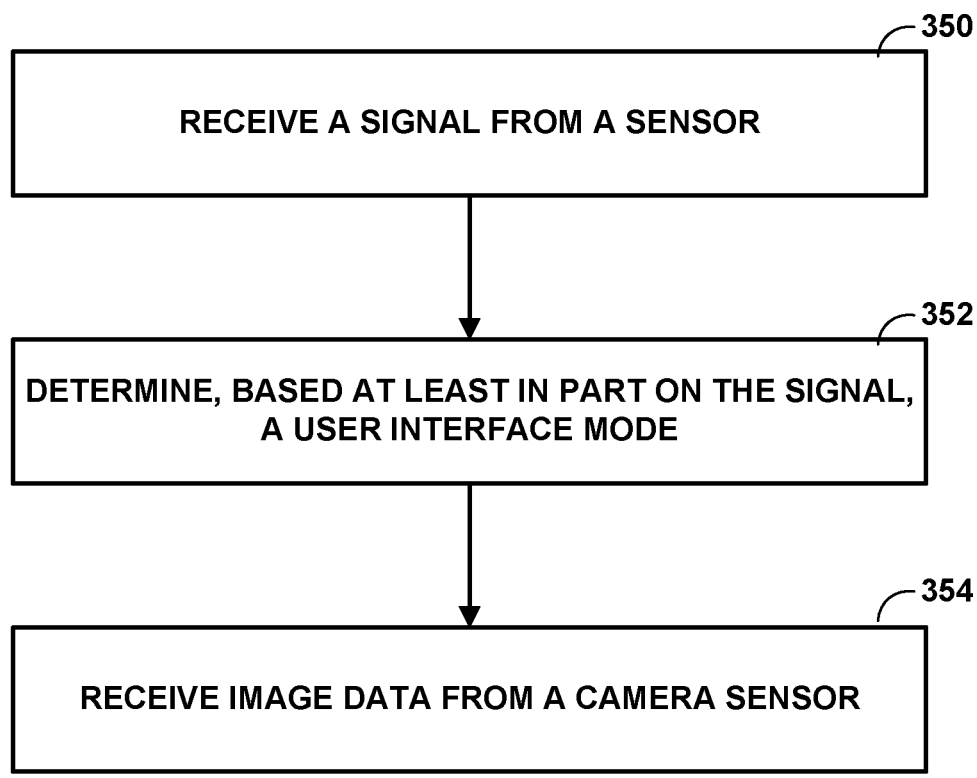
FIG. 17 is a flowchart illustrating another example of determining a user interface according to the techniques of this disclosure.

FIG. 17 is a flowchart illustrating another example of determining a user interface according to the techniques of this disclosure. The techniques of the example of FIG. 17 may be used with the techniques of any of FIGS. 13-16. Image capture device 102 may receive a signal from a sensor (350). For example, one or more processors 110 may receive a signal from ambient light sensor 122. In another example, one or more processors 110 may receive a signal from touch sensor 109. In yet another example, image capture device may receive a signal from camera sensor 112.

Image capture device 102 may determine, based at least in part on the signal, a user interface mode (352). The user interface mode may include a first mode or a second mode. The first mode (e.g., first UI 105) may include a first number of black pixels in a region of a display and the second mode may include a second number of black pixels in the region of the display. The first number may be greater than the second number. For example, the first mode may include all black pixels in the region (e.g., region 504 of FIG. 8A). For example, the second mode may include zero black pixels in the region (e.g., region 514 of FIG. 8B).

Image capture device 102 may receive image data from camera sensor 112 (354). For example, a user may tap an icon on display 116 to cause one or more processors 110 to launch image capture application 104 and camera sensor 112 may capture image data and send the image data to one or more processors 110.

In some examples, one or more processors 110 may determine whether the signal is lower than a threshold and based on the signal being lower than the threshold, one or more processors may control display 116 to display the first mode (e.g., first UI 105). In some examples, one or more processors 110 may receive a second signal from the sensor. One or more processors 110 may determine whether the second signal is lower than the threshold. Based on the second signal not being lower than the threshold, one or more processors 110 may control the display to display the second mode (e.g., second UI 108).

In some examples, one or more processors 110 may launch image capture application 104. In some examples, one or more processors 110 may determine the user interface mode based on launching the image capture application. In some examples, the UI mode may include a third mode comprising a third number of black pixels. In some examples, the third number of black pixels is larger than the second number and smaller than the first number.

In some examples, one or more processors 110 may control display 116 to fade in the black pixels in region 120 over the camera sensor. In some examples, one or more processors 110 may control display 116 to fade out the black pixels in region 120 over the camera sensor. In some examples, one or more processors 110 may control display 116 to fade out the black pixels in region 120 based on an image capture application closing. In some examples, one or more processors 110 may control the display to fade out the black pixels based on a new ambient light level not being lower than the threshold.

The techniques of this disclosure include the following examples.

Example 1. An image capture apparatus comprising: memory; and one or more processors coupled to a camera sensor and the memory and being configured to: receive first image data from the camera sensor, the camera sensor being disposed to receive light through at least a portion of a display; receive at least a portion of display content; determine an adjustment matrix based on the at least a portion of display content; apply the adjustment matrix to the first image data to create second image data; and output the second image data.

Example 2. The apparatus of example 1, wherein the adjustment matrix comprises a two-dimensional gain matrix.

Example 3. The apparatus of example 1 or example 2, wherein the adjustment matrix is further based on preset parameters.

Example 4. The apparatus of example 3, wherein the preset parameters are indicative of at least one of a shape, size or location of sub-pixels in a display or a location of active pixels in the display.

Example 5. The image capture device of any combination of examples 1-4, wherein the adjustment matrix is further based on an aging factor.

Example 6. The image capture device of any combination of examples 1-4, wherein the one or more processors are further configured to multiply the adjustment matrix by an aging factor prior to applying the adjustment matrix.

Example 7. The image capture device of example 5 or example 6, wherein the aging factor is based on a statistical measure of a transmittance decay comparison of pixels in the region above the under-display camera sensor.

Example 8. The apparatus of any combination of examples 1-7, wherein the at least a portion of display content is displayed in a region located at least partially over the camera sensor.

Example 9. The apparatus of any combination of examples 1-8, wherein the one or more processors are configured to apply the adjustment matrix by applying the adjustment matrix in a piecewise bi-linear manner.

Example 10. The apparatus of any combination of examples 1-9, wherein at least a portion of a sub-pixel in the display is disposed over the camera sensor.

Example 11. The apparatus of any combination of examples 1-10, wherein sub-pixels of the display are disposed above and adjacent to the camera sensor with no occlusion of the camera sensor.

Example 12. The apparatus of any combination of examples 1-11, wherein the camera sensor is a first camera sensor, the at least a portion of the display is at least a first portion of the display, the at least a portion of display content is at least a first portion of display content, and the adjustment matrix is a first adjustment matrix, the one or more processors being further configured to: receive third image data from a second camera sensor, the second camera sensor being disposed below at least a portion of a display and being coupled to the one or more processors; receive at least a second portion of display content; determine a second adjustment matrix based on the at least a second portion of display content; apply the second adjustment matrix to the third image data to create fourth image data; and output the fourth image data.

Example 13. The apparatus of any combination of examples 1-12, wherein the one or more processors are configured to apply the adjustment matrix by separately applying an adjustment matrix for each color channel.

Example 14. The apparatus of any combination of examples 1-13, further comprising: the display, the display being configured to display content.

Example 15. The apparatus of any combination of examples 1-14, wherein the display content is based on an image captured by the camera sensor.

Example 16. The apparatus of any combination of examples 1-15, wherein the display comprises an organic light-emitting diode (OLED) display.

Example 17. The apparatus of example 16, wherein the OLED display comprises at least one of a transparent anode and a transparent cathode.

Example 18. The apparatus of example 16 or example 17, wherein the one or more processors are further configured to display content by at least a subset of pixels forming a region of the OLED display when the first image data is received.

Example 19. The apparatus of any combination of examples 1-18, wherein the apparatus comprises a mobile phone.

Example 20. The apparatus of any combination of examples 1-19, wherein the one or more processors are configured to determine the adjustment matrix by selecting the adjustment matrix from a plurality of adjustment matrices stored in memory.

Example 21. The apparatus of example 20, wherein the one or more processors are configured to select the adjustment matrix by calculating an average sum of sub-pixel values in a region and using the average sum as an index to select the adjustment matrix.

Example 22. The apparatus of example 20, wherein the one or more processors are further configured to adjust the selected adjustment matrix.

Example 23. The apparatus of any combination of examples 1-22, wherein the one or more processors are configured to select the adjustment matrix by interpolating between two adjustment matrices.

Example 24. The apparatus of any combination of examples 1-19, wherein the one or more processors are configured to determine the adjustment matrix by calculating the adjustment matrix.

Example 25. The apparatus of any combination of examples 1-24, wherein the one or more processors are configured to determine the adjustment matrix by: storing a portion of one or more frames of the display content; applying a timestamp to each portion of one or more frames of the display content; determining a camera sensor exposure time; determining which frames are associated with the camera sensor exposure time based on the applied timestamp; and determining the adjustment matrix based on the portions of the one or more frames that are associated frames.

Example 26. A method of image processing comprising: receiving, at an image capture device, first image data captured by a camera sensor, wherein the camera sensor is disposed to receive light through at least a portion of a display on the image capture device; receiving, at the image capture device, at least a portion of display content; determining, at the image capture device, an adjustment matrix based on the at least a portion of display content; applying the adjustment matrix to the first image data to create second image data; and outputting the second image data.

Example 27. The method of example 26, wherein the adjustment matrix comprises a two-dimensional gain matrix.

Example 28. The method of example 26 or example 27, wherein the adjustment matrix is further based on preset parameters.

Example 29. The method of example 28, wherein the preset parameters are indicative of at least one of a shape, size or location of sub-pixels in the display or a location of active pixels in the display.

Example 30. The method of any combination of examples 26-29, wherein the adjustment matrix is further based on an aging factor.

Example 31. The method of any combination of examples 26-29, further comprising multiplying the adjustment matrix by an aging factor prior to applying the adjustment matrix.

Example 32. The method of example 30 or example 31, wherein the aging factor is based on a statistical measure of a transmittance decay comparison of pixels in a region above the camera sensor.

Example 33. The method of any combination of examples 26-32, wherein the at least a portion of the display content is displayed in a region located at least partially over the camera sensor.

Example 34. The method of any combination of examples 26-33, wherein applying the adjustment matrix comprises applying the adjustment matrix in a piecewise bi-linear manner.

Example 35. The method of any combination of examples 26-34, wherein at least a portion of a sub-pixel in the display is disposed over the camera sensor.

Example 36. The method of any combination of examples 26-35, wherein sub-pixels of the display are disposed above and adjacent to the camera sensor with no occlusion of the camera sensor.

Example 37. The method of any combination of examples 26-36, wherein the camera sensor is a first camera sensor, the at least a portion of the display is at least a first portion of the display, the at least a portion of display content is at least a first portion of display content, and the adjustment matrix is a first adjustment matrix, the method further comprising: receiving, at an image capture device, third image data captured by a second camera sensor, wherein the second camera sensor is disposed below at least a second portion of a display on the image capture device; receiving, at the image capture device, at least a second portion of display content; determining, at the image capture device, a second adjustment matrix based on the at least a second portion of display content; applying the second adjustment matrix to the third image data to create fourth image data; and outputting the fourth image data.

Example 38. The method of any combination of examples 26-37, wherein applying the adjustment matrix comprises separately applying an adjustment matrix for each color channel.

Example 39. The method of any combination of examples 26-38, wherein the display content is based on an image captured by the camera sensor.

Example 40. The method of any combination of examples 26-39, wherein the display comprises an organic light-emitting diode (OLED) display.

Example 41. The method of example 40, wherein the OLED display comprises at least one of a transparent anode and a transparent cathode.

Example 42. The method of example 40 or example 41, further comprising actively displaying content by at least a subset of pixels forming a region of the OLED display when the first image data is received.

Example 43. The method of any combination of examples 26-42, wherein the image capture device comprises a mobile phone.

Example 44. The method of any combination of examples 26-43, wherein determining the adjustment matrix comprises selecting the adjustment matrix from a plurality of adjustment matrices stored in memory.

Example 45. The method of example 44, wherein selecting the adjustment matrix comprises calculating an average sum of sub-pixel values in a region and using the average sum as an index to select the adjustment matrix.

Example 46. The method of example 44, wherein selecting the adjustment matrix comprises adjusting the adjustment matrix.

Example 47. The method of any combination of examples 26-46, wherein determining the adjustment matrix further comprises interpolating between two adjustment matrices.

Example 48. The method of any combination of examples 26-43, wherein determining the adjustment matrix comprises calculating the adjustment matrix.

Example 49. The method of any combination of examples 26-48, wherein determining the adjustment matrix comprises: storing a portion of one or more frames of the display content; applying a timestamp to each portion of one or more frames of the display content; determining a camera sensor exposure time; determining which frames are associated with the camera sensor exposure time based on the applied timestamp; and determining the adjustment matrix based on the portions of the one or more frames that are associated frames.

Example 50. A non-transitory computer-readable storage medium storing instructions that, when executed, causes one or more processors to: receive first image data from a camera sensor, the camera sensor being disposed to receive light through at least a portion of a display; receive at least a portion of display content; determine an adjustment matrix based on the at least a portion of display content; apply the adjustment matrix to the first image data to create second image data; and output the second image data.

Example 51. An image capture device comprising: a display configured to display captured images; a camera sensor, the camera sensor being disposed to receive light through at least a portion of the display; memory configured to store captured images; and one or more processors coupled to the camera sensor, the display, and the memory and being configured to: receive a signal from a sensor; determine, based at least in part on the signal, a user interface mode, the user interface mode comprising a first mode or a second mode, wherein the first mode comprises a first number of black pixels in a region of the display and the second mode comprises a second number of black pixels in the region of the display, the first number being greater than the second number; and receive image data from the camera sensor.

Example 52. The image capture device of example 51, wherein the sensor is an ambient light sensor.

Example 53. The image capture device of example 51 or 52, wherein the one or more processors are further configured to: determine whether the signal is lower than a threshold; and based on the signal being lower than the threshold, control the display to display the first mode.

Example 54. The image capture device of any combination of examples 51-53, wherein the signal is first signal, and the one or more processors are further configured to: receiving a second signal from the sensor; determine whether the second signal is lower than the threshold; and based on the second signal not being lower than the threshold, control the display to display the second mode.

Example 55. The image capture device of any combination of examples 51-54, wherein the one or more processors are further configured to: launch an image capture application, wherein the one or more processors determine the user interface mode based on launching the image capture application.

Example 56. The image capture device of any combination of examples 52-55, further comprising an ambient light sensor configured to sense an ambient light level.

Example 57. The image capture device of example 51, wherein the sensor is the camera sensor.

Example 58. The image capture device of example 51, wherein the sensor is a touch sensor.

Example 59. The image capture device of example 51, wherein the second number is zero.

Example 60. The image capture device of any combination of examples 51-59, wherein the user interface mode further comprises a third mode comprising a third number of black pixels.

Example 61. The image capture device of example 60, wherein the third number of black pixels is larger than the second number and smaller than the first number.

Example 62. The image capture device of any combination of examples 51-61, wherein the one or more processors are further configured to control the display to fade in the black pixels in the region over the camera sensor.

Example 63. The image capture device of any combination of examples 51-62, wherein the one or more processors are further configured to control the display to fade out the black pixels in the region over the camera sensor.

Example 64. The image capture device of example 63, wherein the one or more processors are further configured to control the display to fade out the black pixels based on an image capture application closing.

Example 65. The image capture device of example 63, wherein the one or more processors control the display to fade out the black pixels based on a new ambient light level not being lower than the threshold.

Example 66. A method comprising: receiving, by an image capture device, a signal from a sensor; determining, by an image capture device and based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number; and receiving, by the image capture device, image data from a camera sensor, wherein the camera sensor is disposed to receive light through at least a portion of the display.

Example 67. The method of example 66, wherein the sensor is an ambient light sensor.

Example 68. The method of example 66 or 67, further comprising: determining, by the image capture device, whether the signal is lower than a threshold; and based on the signal being lower than the threshold, controlling, by the image capture device, the display to display the first mode.

Example 69. The method of any combination of examples 66-68, further comprising: receiving a second signal from the sensor; determining whether the second signal is lower than the threshold; and based on the second signal not being lower than the threshold, control the display to display the second mode.

Example 70. The method of any combination of examples 66-69, further comprising: launching, by the image capture device, an image capture application, wherein the image capture device determines the user interface mode based on launching the image capture application.

Example 71. The method of example 66, wherein the sensor is the camera sensor.

Example 72. The method of example 66, wherein the sensor is a touch sensor.

Example 73. The method of example 66, wherein the second number is zero.

Example 74. The method of any combination of examples 66-73, wherein the user interface mode further comprises a third mode comprising a third number of black pixels.

Example 75. The method of example 74, wherein the third number of black pixels is larger than the second number and smaller than the first number.

Example 76. The method of any combination of examples 66-75, further comprising controlling the display to fade in the black pixels in the region over the camera sensor.

Example 77. The method of any combination of examples 66-76, further comprising controlling the display to fade out the black pixels in the region over the camera sensor.

Example 78. The method of any combination of examples 66-77, further comprising controlling the display to fade out the black pixels based on an image capture application closing.

Example 79. The method of any combination of examples 66-78, further comprising controlling the display to fade out the black pixels based on a new ambient light level not being lower than the threshold.

Example 80. A non-transitory computer-readable storage medium storing instructions that, when executed, causes one or more processors to: receive a signal from a sensor; determine, based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number; and receive image data from a camera sensor, wherein the camera sensor is disposed to receive light through at least a portion of the display.

Example 81. An image capture device comprising: means for receiving a signal from a sensor; means for determining, based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number; and means for receiving, by the image capture device, image data from a camera sensor, wherein the camera sensor is disposed to receive light through at least a portion of the display.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be provided by a collection of interoperative hardware units, including one or more processors as described above, in conjunction with suitable software and/or firmware.

Various examples have been described. These and other examples are within the scope of the following claims.

What is claimed is:

1. An image capture device comprising:
   memory; and
   one or more processors coupled to a camera sensor and the memory and being configured to:
     receive first image data from the camera sensor, the camera sensor being disposed to receive light associated with the first image data through at least a portion of a display at a first time while the display is displaying display content at the first time, the display content being stored in the memory prior to the camera sensor receiving the light associated with the first image data;
   determine an adjustment matrix based on the display content displayed at the first time, at least a portion of the display content displayed at the first time comprising content configured to be displayed on the at least a portion of the display;
   apply the adjustment matrix to the first image data to create second image data; and
   output the second image data.

2. The image capture device of claim 1, wherein the adjustment matrix comprises a two dimensional gain matrix.

3. The image capture device of claim 1, wherein the adjustment matrix is further based on preset parameters.

4. The image capture device of claim 3, wherein the preset parameters are indicative of at least one of a shape, size or location of sub-pixels in a display or a location of active pixels in the display.

5. The image capture device of claim 1, wherein the adjustment matrix is further based on an aging factor.

6. The image capture device of claim 1, wherein the one or more processors are further configured to multiply the adjustment matrix by an aging factor prior to applying the adjustment matrix.

7. The image capture device of claim 5, wherein the aging factor is based on a statistical measure of a transmittance decay comparison of pixels in a region above the camera sensor.

8. The image capture device of claim 1, wherein the at least a portion of the display content displayed at the first time is configured to be displayed in a region located at least partially over the camera sensor.

9. The image capture device of claim 1, wherein the one or more processors are configured to apply the adjustment matrix by applying the adjustment matrix in a piecewise bi-linear manner.

10. The image capture device of claim 1, wherein at least a portion of a sub-pixel in the display is disposed over the camera sensor.

11. The image capture device of claim 1, wherein sub-pixels of the display are disposed above and adjacent to the camera sensor with no occlusion of the camera sensor.

12. The image capture device of claim 1, wherein the camera sensor is a first camera sensor, the at least a portion of the display is at least a first portion of the display, the at least a portion of the display content is at least a first portion of the display content, and the adjustment matrix is a first adjustment matrix, the one or more processors being further configured to:
   receive third image data from a second camera sensor, the second camera sensor being disposed below at least a second portion of the display and being coupled to the one or more processors;
   determine a second adjustment matrix based on a second portion of the display content stored in the memory, the second portion of the display content comprising content configured to be displayed on the at least a second portion of the display;
   apply the second adjustment matrix to the third image data to create fourth image data; and
   output the fourth image data.

13. The image capture device of claim 1, wherein the one or more processors are configured to apply the adjustment matrix by separately applying an adjustment matrix for each color channel.

14. The image capture device of claim 1, wherein the image capture device comprises a mobile phone.

15. A method of image processing comprising:
   receiving, at an image capture device, first image data captured by a camera sensor, wherein the camera sensor is disposed to receive light associated with the first image data through at least a portion of a display at a first time on the image capture device while the display is displaying display content at the first time, the display content being stored in the memory prior to the camera sensor receiving light associated with the first image data;
   determining, at the image capture device, an adjustment matrix based on the display content displayed at the first time, at least a portion of the display content displayed at the first time comprising content displayed on the at least a portion of the display;
   applying the adjustment matrix to the first image data to create second image data; and
   outputting the second image data.

16. The method of claim 15, wherein the adjustment matrix is further based on preset parameters.

17. The method of claim 16, wherein the preset parameters are indicative of at least one of a shape, size or location of sub-pixels in the display or a location of active pixels in the display.

18. The method of claim 15, wherein the adjustment matrix is further based on an aging factor.

19. The method of claim 15, further comprising multiplying the adjustment matrix by an aging factor prior to applying the adjustment matrix.

20. The method of claim 18, wherein the aging factor is based on a statistical measure of a transmittance decay comparison of pixels in a region above the camera sensor.

21. The method of claim 15, wherein the at least a portion of the display content displayed at the first time is displayed in a region located at least partially over the camera sensor.

22. The method of claim 15, wherein applying the adjustment matrix comprises applying the adjustment matrix in a piecewise bi-linear manner.

23. The method of claim 15, wherein at least a portion of a sub-pixel in the display is disposed over the camera sensor.

24. The method of claim 15, wherein sub-pixels of the display are disposed above and adjacent to the camera sensor with no occlusion of the camera sensor.

25. The method of claim 15, wherein the camera sensor is a first camera sensor, the at least a portion of the display is at least a first portion of the display, the at least a portion of the display content is at least a first portion of the display content, and the adjustment matrix is a first adjustment matrix, the method further comprising:
   receiving, at an image capture device, third image data captured by a second camera sensor, wherein the second camera sensor is disposed below at least a second portion of the display on the image capture device;
   determining, at the image capture device, a second adjustment matrix based on a second portion of the display content stored in the memory, the second portion of the display content comprising content displayed on the at least a second portion of the display;
   applying the second adjustment matrix to the third image data to create fourth image data; and
   outputting the fourth image data.

26. The method of claim 15, wherein applying the adjustment matrix comprises separately applying an adjustment matrix for each color channel.

27. The method of claim 15, wherein the image capture device comprises a mobile phone.

28. A non-transitory computer-readable storage medium storing instructions that, when executed, causes one or more processors to:
receive first image data from a camera sensor, the camera sensor being disposed to receive light associated with the first image data through at least a portion of a display at a first time while the display is displaying display content at the first time, the display content being stored in the memory prior to the camera sensor receiving the light associated with the first image data;
determine an adjustment matrix based on the display content displayed at the first time, at least a portion of the display content displayed at the first time comprising content configured to be displayed on the at least a portion of the display;
apply the adjustment matrix to the first image data to create second image data; and
output the second image data.

29. An image capture device comprising:
a display configured to display captured images;
a camera sensor, the camera sensor being disposed to receive light through at least a portion of the display;
memory configured to store captured images; and
one or more processors coupled to the camera sensor, the display, and the memory and being configured to:
receive a signal from a sensor;
determine, based at least in part on the signal, a user interface mode, the user interface mode comprising a first mode or a second mode, wherein the first mode comprises a first number of black pixels in a region of the display and the second mode comprises a second number of black pixels in the region of the display, the first number being greater than the second number, wherein as part of determining the user interface mode, the one or more processors are configured to determine whether the signal is lower than a threshold, and based on the signal being lower than the threshold, determine the user interface mode to be the first mode;
receive image data from the camera sensor; and
control the display to display the first mode.

30. The image capture device of claim 29, wherein the sensor is an ambient light sensor.

31. The image capture device of claim 29, wherein the signal is first signal, and the one or more processors are further configured to:
receiving a second signal from the sensor;
determine whether the second signal is lower than the threshold; and
based on the second signal not being lower than the threshold, control the display to display the second mode.

32. The image capture device of claim 29, wherein the one or more processors are further configured to:
launch an image capture application,
wherein the one or more processors determine the user interface mode based on launching the image capture application.

33. A non-transitory computer-readable storage medium storing instructions that, when executed, cause one or more processors to:
receive a signal from a sensor;
determine, based at least in part on the signal, a user interface mode, the user interface mode comprising a first mode or a second mode, wherein the first mode comprises a first number of black pixels in a region of a display and the second mode comprises a second number of black pixels in the region of the display, the first number being greater than the second number wherein as part of determining the user interface mode, the instructions cause the one or more processors to determine whether the signal is lower than a threshold, and based on the signal being lower than the threshold, determine the user interface mode to be the first mode;
receive image data from a camera sensor, wherein the camera sensor is disposed to receive light through at least a portion of the display; and
control the display to display the first mode.

34. The method of claim 15, wherein the adjustment matrix comprises a two-dimensional gain matrix.

\* \* \* \* \*